United States Patent
Smyth et al.

(10) Patent No.: US 11,762,130 B1
(45) Date of Patent: Sep. 19, 2023

(54) OPTICAL LENS ASSEMBLIES, HEAD-MOUNTED DISPLAYS, AND RELATED METHODS

(71) Applicant: META PLATFORMS TECHNOLOGIES, LLC, Menlo Park, CA (US)

(72) Inventors: Katherine Marie Smyth, Seattle, WA (US); John M. Cooke, Bothell, WA (US); Andrew John Ouderkirk, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 577 days.

(21) Appl. No.: 16/021,650

(22) Filed: Jun. 28, 2018

Related U.S. Application Data

(60) Provisional application No. 62/650,254, filed on Mar. 29, 2018.

(51) Int. Cl.
*G02B 3/14* (2006.01)
*G02B 27/01* (2006.01)
*G06F 3/01* (2006.01)

(52) U.S. Cl.
CPC .............. *G02B 3/14* (2013.01); *G02B 27/0172* (2013.01); *G06F 3/013* (2013.01)

(58) Field of Classification Search
CPC ......... G02B 3/14; G02B 27/0172; G02B 1/06; G06F 3/013; G02B 13/0075; G02B 26/004
See application file for complete search history.

(56) References Cited

U.S. PATENT DOCUMENTS

| | | | |
|---|---|---|---|
| 60,109 | A | 11/1866 | Woodward |
| 3,571,555 | A | 3/1971 | Townes et al. |
| 3,797,922 | A | 3/1974 | Plummer |
| 4,477,158 | A | 10/1984 | Pollock et al. |
| 5,154,862 | A | 10/1992 | Reagan et al. |
| 5,225,244 | A | 7/1993 | Aharoni et al. |
| 5,663,779 | A | 9/1997 | Karasawa |

(Continued)

FOREIGN PATENT DOCUMENTS

KR 10-2011-0107812 A 10/2011
KR 101675093 B1 * 11/2016
(Continued)

OTHER PUBLICATIONS

'Adjustable Reading Glasses," URL: https://adlens.com/, retrieved on May 7, 2018, 1 page.
Adaptive glasses, http://tvc.utah.edu, as accessed on Mar. 13, 2018.
Ouderkirk, et al.; Apparatuses, Systems, And Methods For Adjusting Fluid Lenses; U.S. Appl. No. 16/008,635; Filed Jun. 14, 2018.
Ouderkirk, et al.; Electroactive Polymer Devices And Nanovoided Polymer Materials And Methods And Systems For Fabrication Thereof; U.S. Appl. No. 16/106,945; Filed Aug. 21, 2018.
(Continued)

*Primary Examiner* — Alicia M Harrington
(74) *Attorney, Agent, or Firm* — Greenberg Traurig, LLP

(57) ABSTRACT

The disclosed optical lens assemblies may include a deformable element, a structural support element, and a compliant interface material that is disposed between and couples at least a portion of the deformable element and the structural support element. The deformable element may, when deformed, alter an optical property of the optical lens assembly. The compliant interface material may be configured to compensate for a difference between a physical property of the deformable element and the structural support element. Related head-mounted displays and methods are also disclosed.

18 Claims, 11 Drawing Sheets

(56) References Cited

U.S. PATENT DOCUMENTS

| | | | |
|---|---|---|---|
| 5,956,183 | A | 9/1999 | Epstein et al. |
| 6,081,388 | A | 6/2000 | Widl |
| 6,420,441 | B1 | 7/2002 | Allen et al. |
| 6,918,670 | B2 | 7/2005 | Blum et al. |
| 7,008,054 | B1 | 3/2006 | Kurtin et al. |
| 7,118,219 | B2 | 10/2006 | Itagaki |
| 7,125,508 | B2 | 10/2006 | Ide et al. |
| 7,864,440 | B2 | 1/2011 | Berge |
| 7,866,816 | B2* | 1/2011 | Kurtin ................ G02C 7/086 351/159.46 |
| 8,210,678 | B1 | 7/2012 | Farwig |
| 8,441,737 | B2* | 5/2013 | Buch et al. ............ G02C 7/085 359/665 |
| 9,292,085 | B2 | 3/2016 | Bennett et al. |
| 10,187,568 | B1* | 1/2019 | Tran et al. ............ H04M 1/0264 |
| 10,409,089 | B2 | 9/2019 | Pugh et al. |
| 10,698,224 | B1 | 6/2020 | Cooke et al. |
| 10,754,145 | B1 | 8/2020 | Ouderkirk et al. |
| 10,881,287 | B1 | 1/2021 | Ouderkirk et al. |
| 10,928,558 | B1 | 2/2021 | Cooke et al. |
| 10,928,656 | B1 | 2/2021 | Smyth et al. |
| 10,962,791 | B1 | 3/2021 | Ouderkirk et al. |
| 11,011,739 | B1 | 5/2021 | Ouderkirk et al. |
| 11,048,075 | B1 | 6/2021 | Ouderkirk et al. |
| 2003/0003295 | A1 | 1/2003 | Dreher et al. |
| 2003/0054115 | A1 | 3/2003 | Albano et al. |
| 2003/0067245 | A1 | 4/2003 | Pelrine et al. |
| 2003/0083433 | A1 | 5/2003 | James et al. |
| 2003/0128496 | A1 | 7/2003 | Allen et al. |
| 2004/0096672 | A1 | 5/2004 | Lukas et al. |
| 2006/0024976 | A1 | 2/2006 | Waldfried et al. |
| 2006/0073424 | A1 | 4/2006 | Koveshnikov et al. |
| 2006/0228092 | A1 | 10/2006 | Hebrink et al. |
| 2006/0247404 | A1 | 11/2006 | Todd |
| 2007/0035839 | A1 | 2/2007 | Ibuki |
| 2008/0038561 | A1 | 2/2008 | Yoshizawa et al. |
| 2008/0049431 | A1 | 2/2008 | Boek et al. |
| 2008/0084532 | A1 | 4/2008 | Kurtin |
| 2008/0088793 | A1 | 4/2008 | Sverdrup et al. |
| 2008/0123049 | A1 | 5/2008 | Volk |
| 2008/0144185 | A1 | 6/2008 | Wang et al. |
| 2008/0170299 | A1 | 7/2008 | Kawabata |
| 2008/0171431 | A1 | 7/2008 | Yu et al. |
| 2008/0290435 | A1 | 11/2008 | Oliver et al. |
| 2008/0291394 | A1 | 11/2008 | Ishak |
| 2009/0015786 | A1 | 1/2009 | Harris |
| 2009/0027778 | A1 | 1/2009 | Wu et al. |
| 2009/0096106 | A1 | 4/2009 | Vrtis et al. |
| 2009/0289529 | A1 | 11/2009 | Ito et al. |
| 2009/0304924 | A1 | 12/2009 | Gadgil |
| 2010/0075056 | A1 | 3/2010 | Axisa et al. |
| 2010/0109486 | A1 | 5/2010 | Polyakov et al. |
| 2010/0168409 | A1 | 7/2010 | Fujita |
| 2010/0202054 | A1 | 8/2010 | Niederer |
| 2010/0238400 | A1 | 9/2010 | Volk |
| 2011/0075096 | A1 | 3/2011 | Ishak et al. |
| 2011/0085131 | A1 | 4/2011 | Gupta et al. |
| 2011/0096411 | A1* | 4/2011 | Henriksen et al. . G02B 26/0875 359/694 |
| 2011/0149410 | A1 | 6/2011 | Blum |
| 2011/0176105 | A1 | 7/2011 | Harris |
| 2011/0179861 | A1 | 7/2011 | Grange et al. |
| 2011/0235326 | A1 | 9/2011 | Yeh et al. |
| 2011/0294305 | A1 | 12/2011 | Jacobs et al. |
| 2012/0029416 | A1 | 2/2012 | Parker et al. |
| 2012/0032559 | A1 | 2/2012 | Hino et al. |
| 2012/0041553 | A1 | 2/2012 | Gupta et al. |
| 2012/0044571 | A1* | 2/2012 | Mukawa ............ G02B 27/0172 359/630 |
| 2012/0063000 | A1* | 3/2012 | Batchko et al. ......... G02B 5/20 359/666 |
| 2012/0087015 | A1 | 4/2012 | Nibauer et al. |
| 2012/0092775 | A1 | 4/2012 | Duston et al. |
| 2012/0170920 | A1 | 7/2012 | Moreau et al. |
| 2012/0229754 | A1* | 9/2012 | Iyer et al. ............ G02C 7/083 351/159.4 |
| 2012/0250151 | A1 | 10/2012 | Lee et al. |
| 2012/0287512 | A1 | 11/2012 | Egan et al. |
| 2013/0171546 | A1 | 7/2013 | White et al. |
| 2013/0176628 | A1 | 7/2013 | Batchko et al. |
| 2013/0300635 | A1 | 11/2013 | White et al. |
| 2014/0009039 | A1 | 1/2014 | Jenninger et al. |
| 2014/0078586 | A1 | 3/2014 | Spurgeon et al. |
| 2014/0153102 | A1 | 6/2014 | Chang |
| 2014/0186215 | A1 | 7/2014 | Shinta et al. |
| 2014/0227548 | A1 | 8/2014 | Myrick |
| 2014/0300857 | A1 | 10/2014 | Cohen-Tannoudji et al. |
| 2014/0312737 | A1 | 10/2014 | Jenninger et al. |
| 2015/0062719 | A1 | 3/2015 | Kyung et al. |
| 2015/0116656 | A1 | 4/2015 | Stevens et al. |
| 2015/0138110 | A1 | 5/2015 | Yairi et al. |
| 2015/0146161 | A1 | 5/2015 | Rigato et al. |
| 2015/0302990 | A1 | 10/2015 | Ghosh et al. |
| 2015/0323812 | A1 | 11/2015 | Ishak et al. |
| 2016/0004099 | A1 | 1/2016 | Stevens et al. |
| 2016/0091635 | A1 | 3/2016 | Ibuki et al. |
| 2016/0187985 | A1 | 6/2016 | Lim et al. |
| 2017/0021385 | A1 | 1/2017 | Smith et al. |
| 2017/0045649 | A1 | 2/2017 | Bolis |
| 2017/0160600 | A1 | 6/2017 | Galstian et al. |
| 2017/0177106 | A1 | 6/2017 | Kihara |
| 2017/0184848 | A1 | 6/2017 | Vallius |
| 2017/0188021 | A1 | 6/2017 | Lo et al. |
| 2017/0192595 | A1 | 7/2017 | Choi et al. |
| 2017/0261653 | A1 | 9/2017 | Peyman |
| 2017/0299956 | A1 | 10/2017 | Holland et al. |
| 2017/0317269 | A1 | 11/2017 | Zhang et al. |
| 2017/0336641 | A1 | 11/2017 | von und zu Liechtenstein |
| 2018/0255250 | A1 | 9/2018 | Price et al. |
| 2018/0275394 | A1 | 9/2018 | Yeoh et al. |
| 2018/0335649 | A1 | 11/2018 | Tsai |
| 2019/0173128 | A1 | 6/2019 | Visco et al. |
| 2019/0243123 | A1 | 8/2019 | Bohn |
| 2019/0296218 | A1 | 9/2019 | Ouderkirk et al. |
| 2019/0302479 | A1 | 10/2019 | Smyth et al. |
| 2020/0166742 | A1 | 5/2020 | Peyman |
| 2020/0251709 | A1 | 8/2020 | Lee et al. |

FOREIGN PATENT DOCUMENTS

| | | | |
|---|---|---|---|
| WO | 2008/156166 | A1 | 12/2008 |
| WO | 2010/078666 | A1 | 7/2010 |
| WO | 2010/104904 | A2 | 9/2010 |
| WO | 2019/183431 | A1 | 9/2019 |
| WO | 2019/190887 | A1 | 10/2019 |

OTHER PUBLICATIONS

Ouderkirk, et al.; Electroactive Polymer Devices, Systems, And Methods; U.S. Appl. No. 16/035,562; Filed Jul. 13, 2018.

Ouderkirk, et al.; Electroactive Polymer Devices, Systems, And Methods; U.S. Appl. No. 16/059,091; Filed Aug. 9, 2018.

Ouderkirk, et al.; Multi-Element Prescription Lenses With Eye-Tracking; U.S. Appl. No. 16/041,634; Filed Jul. 20, 2018.

Ouderkirk, et al.; Nanovoided Electroactive Polymer Devices, Systems, And Methods; U.S. Appl. No. 16/041,858; Filed Jul. 23, 2018.

Ouderkirk, et al.; Optical Devices, Systems, And Methods Of Manufacturing; U.S. Appl. No. 62/646,900; Filed Mar. 22, 2018.

Ouderkirk, et al.; Optical Devices, Systems, And Methods Of Manufacturing; U.S. Appl. No. 62/650,254; Filed Mar. 29, 2018.

Ouderkirk, et al.; Optical Lens Assemblies And Related Methods; U.S. Appl. No. 16/018,752; Filed Jun. 26, 2018.

Billah et al., Microstructure Evolution and Electrical Characterization of Lanthanum doped Barium Titanate (BaTiO3) Ceramics, Int'l Conference on Mechanical Engineering, AIP Conf. Proc. 1754, 030006-1-030006-7 (Jul. 12, 2016).

Cao et al., Grain Size and Domain Size Relations in Bulk Ceramic Ferroelectric Materials, J. Phys. Chem Solids Vol 57, No. 10, pp. 1499-1505, 1996.

Communication pursuant to Article 94(3) EPC received for EP Patent Application Serial No. 19715707.6 dated Mar. 22, 2021, 5 page.

(56) References Cited

OTHER PUBLICATIONS

Ding et al., "Surface profiling of an aspherical liquid lens with a varied thickness membrane," Optics Express 3122-3132, Vol. 25, No. 4 (Feb. 6, 2017).
Examiner-Initiated Interview Summary received for U.S. Appl. No. 16/008,635 dated Apr. 20, 2020, 3 pages.
Final Office Action received for U.S. Appl. No. 15/992,731 dated Jun. 2, 2020, 25 pages.
Final Office Action received for U.S. Appl. No. 16/018,752 dated Nov. 30, 2020, 41 pages.
Final Office Action received for U.S. Appl. No. 16/059,091 dated Sep. 21, 2020, 18 pages.
Final Office Action received for U.S. Appl. No. 16/106,945 dated Nov. 24, 2020, 94 pages.
Guha et al., "Creating nanoscale emulsions using condensation", Nature Communications, Vol. 8, No. 1371, Nov. 2017, pp. 1-7.
He et al., Linear Electro-Optic Properties of Orthorhombic PZN-8%PT Single Crystal, IEEE Transactions on Ultrasonics, Ferroelectrics, and Frequency Control, Vol. 58, No. 6 (Jun. 1, 2011).
http://glidewelldental.com/education/inclusive-dental-implant-magazine-volume-2-issue-4/, as accessed on Jun. 12, 2018.
http://www.optotune.com/technology/focus-tunable-lenses, as accessed on Mar. 13, 2018.
http://www.polight.com/technology-and-products/how-does-it-work/default.aspx, as accessed on Mar. 13, 2018.
https://adlens.com/how-it-works/, as accessed on Mar. 28, 2018.
https://www.piceramic.com/en/piezo-technology/picma/, as accessed on Mar. 14, 2018.
https://www.piceramic.com/en/piezo-technology/properties-piezo-actuators/displacement-modes/, as accessed on Mar. 14, 2018.
International Preliminary Report on Patentability received for PCT Application Serial No. PCT/US2019/023484 dated Oct. 1, 2020, 8 pages.
International Preliminary Report on Patentability received for PCT Application Serial No. PCT/US2019/023485 dated Oct. 8, 2020, 8 pages.
International Search Report and Written Opinion received for PCT Application Serial No. PCT/US2019/023484 dated Jul. 3, 2019, 9 pages.
International Search Report and Written Opinion received for PCT Application Serial No. PCT/US2019/023485 dated Jul. 4, 2019, 11 pages.
Jiang et al., Transparent Electro-Optic Ceramics and Devices, Optoelectronic devices and integration, pts 1 and 2; SPIE-Int Soc Optical Engineering, Bellingham, pp 380-394 (Jan. 17, 2005).
Cooke, et al.; Optical Lens Assemblies, Head-Mounted Displays, And Methods Of Altering Optical Properties Of Optical Lens Assemblies; U.S. Appl. No. 16/013,837; Filed Jun. 20, 2018.
Cooke, et al.; Optical Lens Assemblies, Head-Mounted Displays, And Related Methods; U.S. Appl. No. 16/021,580; Filed Jun. 28, 2018.
Smyth, et al.; Optical Lens Assemblies And Related Methods; U.S. Appl. No. 16/018,746; Filed Jun. 26, 2018.
Smyth, et al.; Optical Lens Assemblies, Head-Mounted Displays, And Related Methods; U.S. Appl. No. 16/016,428; Filed Jun. 22, 2018.
Smyth, et al.; Systems And Methods For Actuation Of Asymmetric Optical Elements; U.S. Appl. No. 15/992,731; Filed May 30, 2018.
Keplinger et al., Stretchable, Transparent, Ionic Conductors, Science Magazine, vol. 341, pp. 984-987 (Aug. 30, 2013).
Kong et al., Transparent Ceramics, Topics in Mining, Metallurgy, and Materials Engineering, Ch. 2: Transparent Ceramic Materials, pp. 29-91 (2015).
Gurvich, "On Characterization of Anisotropic Elastomeric Materials for Structural Analysis" (2004); Rubber Chemistry and Technology, Volume 77, Issue 1; pages 115-130. (Year: 2004).*
Merriam-Webster, "Porosity", URL: https://www.merriam-webster.com/dictionary/porosity, retrieved on Apr. 8, 2020, pp. 1-8.
Non-Final Office Action received for U.S. Appl. No. 16/016,428 dated Jun. 16, 2021, 43 pages.
Non-Final Office Action received for U.S. Appl. No. 16/016,428 dated Mar. 12, 2021, 56 pages.
Non-Final Office Action received for U.S. Appl. No. 16/035,562 dated Jun. 10, 2021, 36 pages.
Non-Final Office Action received for U.S. Appl. No. 16/106,945 dated Mar. 30, 2021, 111 pages.
Non-Final Office Action received for U.S. Appl. No. 15/992,731 dated Aug. 24, 2020, 27 pages.
Non-Final Office Action received for U.S. Appl. No. 16/013,837 dated Jan. 23, 2020, 22 pages.
Non-Final Office Action received for U.S. Appl. No. 16/041,634 dated Jul. 30, 2020, 24 pages.
Non-Final Office Action received for U.S. Appl. No. 16/059,091 dated Apr. 8, 2020, 54 pages.
Non-Final Office Action received for U.S. Appl. No. 16/106,945 dated Apr. 16, 2020, 59 pages.
Notice of Allowance Action received for U.S. Appl. No. 16/018,746 dated Sep. 17, 2020, 24 pages.
Notice of Allowance received for U.S. Appl. No. 16/018,752 dated Mar. 10, 2021, 32 pages.
Notice of Allowance received for U.S. Appl. No. 15/972,794 dated Oct. 16, 2020, 22 pages.
Notice of Allowance received for U.S. Appl. No. 15/992,731 dated Nov. 18, 2020, 37 pages.
Notice of Allowance received for U.S. Appl. No. 16/008,635 dated May 4, 2020, 32 pages.
Notice of Allowance received for U.S. Appl. No. 16/013,837 dated Apr. 14, 2020, 14 pages.
Notice of Allowance received for U.S. Appl. No. 16/018,746 dated Nov. 3, 2020, 39 pages.
Notice of Allowance received for U.S. Appl. No. 16/021,580 dated Dec. 9, 2020, 68 pages.
Notice of Allowance received for U.S. Appl. No. 16/041,634 dated Aug. 28, 2020, 31 pages.
Patra et al., Comparison on Optical Properties of Pure and Doped Lithium Tetraborate Single Crystals and Glasses, Solid State Physics: Proceedings of the 56th DAE Solid State Physics Symposium 2011, AIP Conf. Proc. 1447, 1335-46 (Dec. 11, 2012).
Preinterview First Office Action received for U.S. Appl. No. 15/992,731 dated Sep. 27, 2019, 17 pages.
Preinterview First Office Action received for U.S. Appl. No. 16/018,746 dated Jul. 14, 2020, 20 pages.
Preinterview First Office Action received for U.S. Appl. No. 16/018,752 dated Dec. 16, 2019, 19 pages.
Preinterview First Office Action received for U.S. Appl. No. 16/021,580 dated Aug. 4, 2020, 48 pages.
Riegler et al., Index Matching Silicone for High Brightness LED Packaging (Mar. 18, 2005).
Shian et al., Tunable Lenses using Transparent Dielectric Elastomer Actuators, Optics Express, Vol. 21, No. 7 (Apr. 2, 2013).
The effect of slip on the motion of a sphere close to a wall and of two adjacent spheres, L. M. Hocking (Jul. 1, 1973).
Wang et al., A Highly Stretchable, Transparent, and Conductive Polymer, Sci. Adv. 2017; 3:e1602076 (Mar. 10, 2017).
www.americanpiezo.com/knowledge-center/piezo-theory/new-materials/html, as accessed on Mar. 15, 2018.
Zhao et al., "Spherical aberration free liquid-filled tunable lens with variable thickness membrane," Optics Express 21264-21278, Vol. 23, No. 16. (Aug. 5, 2015).

* cited by examiner

OPTICAL LENS ASSEMBLIES, HEAD-MOUNTED DISPLAYS, AND RELATED METHODS

CROSS REFERENCE TO RELATED APPLICATION

This application claims the benefit of U.S. Provisional Application No. 62/650,254, filed Mar. 29, 2018, the entire disclosure of which is incorporated herein by this reference.

BACKGROUND

Adjustable-lens systems have proven to be useful in a variety of devices, including eyeglasses, cameras, and virtual or augmented reality ("VR/AR") systems. One example of an adjustable-lens system is a so-called liquid lens assembly. As accommodative elements, liquid lenses are varifocal, have high transmissivity, and, with proper optical design, can achieve low off-axis aberration and distortion for high image quality over a range of optical powers.

Liquid lenses often include a flexible membrane that is directly coupled to a rigid backplane and a fluid that is disposed between the rigid backplane and the membrane. In order to withstand repeated actuation and deformation without failure, the flexible membrane is often made of an elastomeric material. However, because lens form factors often necessitate a large clear aperture (and thus a large membrane), so-called gravity sag can be an issue, especially when highly elastic membranes are used. While the elastomeric membrane may be pre-tensioned to at least partially counteract the effects of gravity sag, pre-tensioning may introduce stress at the interface between the membrane and the rigid backplane. Also, the physical properties (e.g., coefficient of thermal expansion, etc.) of elastomeric membranes may significantly differ from that of their corresponding backplanes, which can introduce challenges in membrane material selection and boundary design.

SUMMARY

As will be described in greater detail below, the present disclosure describes optical lens assemblies and head-mounted displays ("HMDs") including deformable elements coupled to corresponding structural support elements by way of a compliant interface material.

For example, an optical lens assembly may include a deformable element, a structural support element, and a compliant interface material that is disposed between and couples at least a portion of the deformable element and the structural support element. The deformable element, when deformed, may alter an optical property of the optical lens assembly. The compliant interface material may be configured to compensate for a difference between a physical property of the deformable element and the structural support element.

In some examples, the physical property may include at least one of a coefficient of thermal expansion, a stiffness, an applied pre-tension, a modulus of elasticity, or an electrical conductivity. For example, the structural support element may exhibit a first coefficient of thermal expansion, the deformable element may exhibit a second, different coefficient of thermal expansion, and the compliant interface material may exhibit a third coefficient of thermal expansion that falls between the first and second coefficients of thermal expansion.

In some examples, the optical lens assembly may also include a housing supporting the structural support element and at least partially covering a peripheral edge of the structural support element. The compliant interface material may be at least partially covered by the housing.

In some embodiments, the deformable element may include at least one substantially transparent electroactive material that is configured to deform when an electrical voltage is applied thereto. A force distribution ring, which may be configured to deform the deformable element, may abut against the deformable element on a side thereof opposite the compliant interface material. The compliant interface material may be disposed along a peripheral edge region of the deformable element or of the structural support element. In some examples, the compliant interface material may be disposed along substantially an entire surface area of the deformable element or of the structural support element.

In some examples, the compliant interface material may include a hyperelastic material or a composite material. The compliant interface material may exhibit anisotropic material properties.

A substantially transparent deformable medium may also be positioned between the structural support element and the deformable element. At least a portion of the substantially transparent deformable medium may serve as the compliant interface material. Alternatively, the substantially transparent deformable medium may be separate from, and laterally adjacent to, the compliant interface material. The compliant interface material may be configured to constrain the substantially transparent deformable medium between the deformable element and the structural support element.

In some examples, the compliant interface material may prevent the deformable element from directly interfacing with any portion of the structural support element. At least a portion of the optical lens assembly may be asymmetric. In addition, the structural support element may include at least one of an eye-tracking element or an optical lens. The optical property may include at least one of an accommodative optical property or an adaptive optical property.

The present disclosure also details various head-mounted displays that may include a display element and an optical lens assembly positioned proximate to the display element. The optical lens assembly may include a deformable element, a structural support element, and a compliant interface material that is disposed between and couples at least a portion of the deformable element and the structural support element. The deformable element may, when deformed, alter an optical property of the optical lens assembly. The compliant interface material may be configured to compensate for a difference between a physical property of the deformable element and the structural support element.

The present disclosure also describes various methods of fabricating an optical lens assembly. In accordance with such methods, a compliant interface material may be selected to compensate for a difference between a physical property of a deformable element and a structural support element. At least a portion of the deformable element may be coupled to at least a portion of the structural support element via the compliant interface material.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
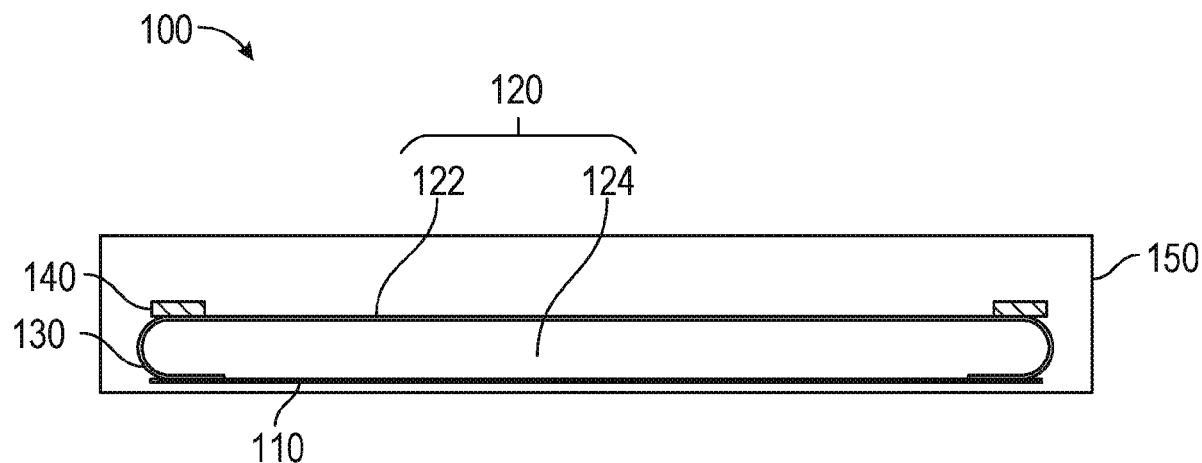
FIG. 1 is a cross-sectional side view of an optical lens assembly in a neutral, non-actuated state.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, combinations, and alternatives falling within the scope of the appended claims.

DETAILED DESCRIPTION OF EXAMPLE EMBODIMENTS

The present disclosure is generally directed to optical lens assemblies, HMDs including the same, and related methods. As will be explained in greater detail below, embodiments of the present disclosure may include a compliant interface material positioned between and coupling a deformable element and a corresponding structural support element. Such a compliant interface material may alleviate stress (e.g., due to pre-tensioning or a mismatch of one or more material properties) at an interface between the deformable element and the structural support element that might otherwise be present if the deformable element were directly bonded to the structural support element.

Figure 23:
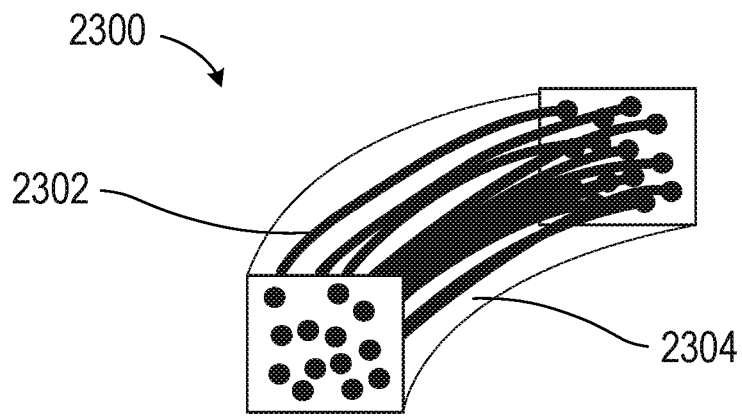
FIG. 23 is a partial perspective view of a compliant interface material according to some embodiments of the present disclosure.
Figure 24:
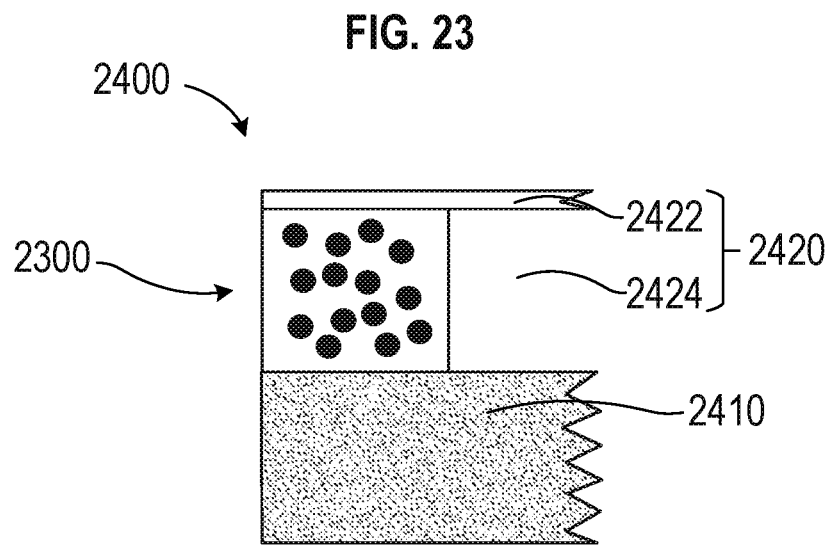
FIG. 24 is a partial cross-sectional side view of an optical lens assembly, in a neutral, non-actuated state, that employs the compliant interface material of FIG. 23.
Figure 25:
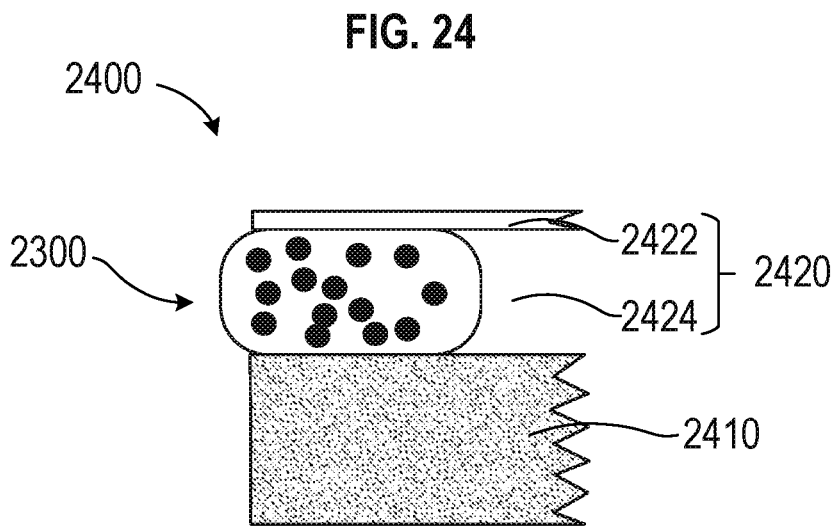
FIG. 25 is a partial cross-sectional side view of the optical lens assembly of FIG. 24 in an actuated state.

The following will provide, with reference to FIGS. 1-4 detailed descriptions of example optical lens assemblies that include a deformable element coupled to a structural support element. The description of FIG. 5 relates to an embodiment of an HMD that includes optical lens assemblies according to the present disclosure. With reference to FIGS. 6-22, the following will provide detailed descriptions of several embodiments of optical lens assemblies according to the present disclosure. FIGS. 23-25 illustrate an embodiment of a compliant interface material that may exhibit anisotropic properties. The discussion relating to FIG. 26 will provide a detailed description of a method of fabricating optical lens assemblies according to the present disclosure.

Figure 2:
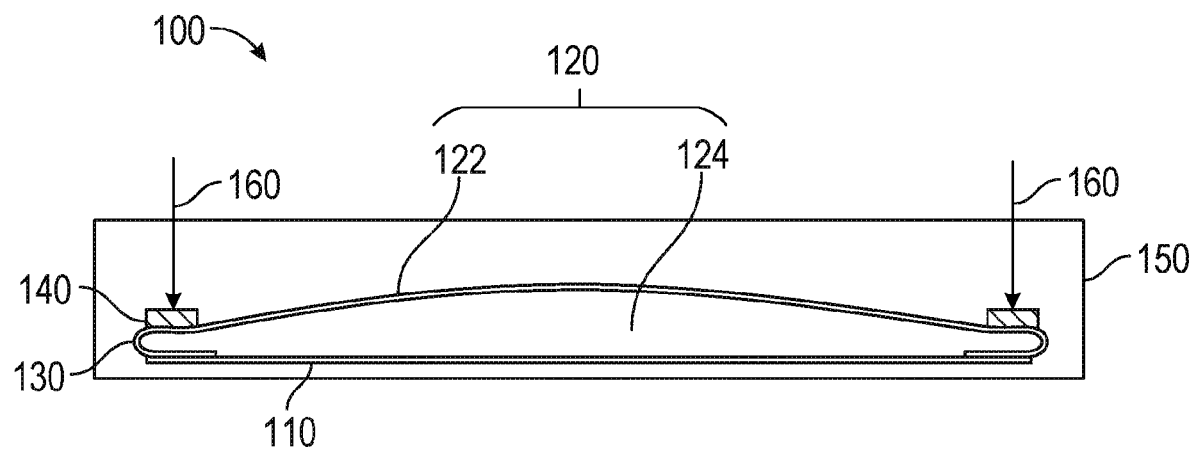
FIG. 2 is a cross-sectional side view of the optical lens assembly of FIG. 1 in a convex actuated state.
Figure 3:
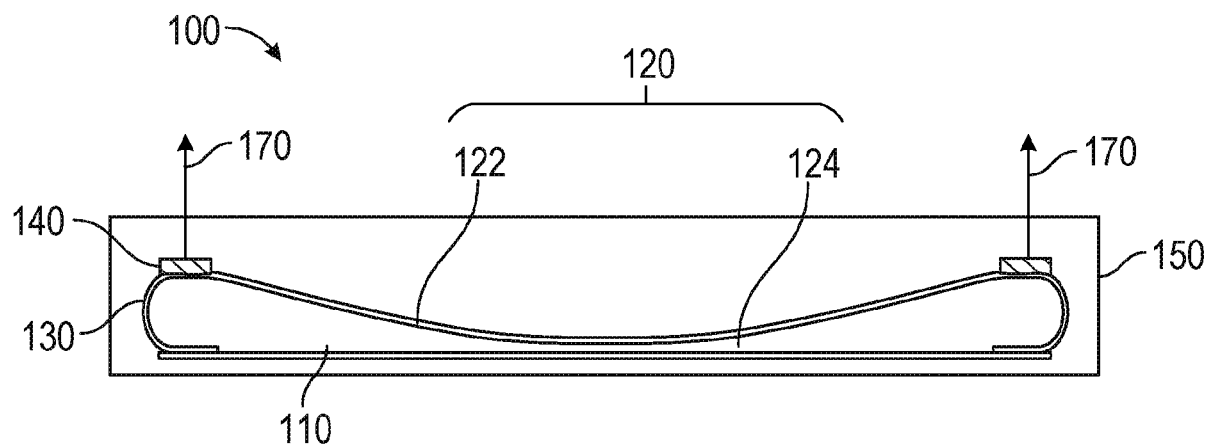
FIG. 3 is a cross-sectional side view of the optical lens assembly of FIG. 1 in a concave actuated state.

FIG. 1 shows a cross-sectional side view of an example optical lens assembly 100 in a neutral, non-actuated state. FIG. 2 shows the optical lens assembly 100 in a convex actuated state and FIG. 3 shows the optical lens assembly 100 in a concave actuated state. The optical lens assembly 100 may include a rigid or semi-rigid structural support element 110, and a deformable optical element 120 (including a deformable element 122 and a deformable medium 124) positioned over the structural support element 110. An outer periphery 130 of the deformable element 122 may be coupled (e.g., bonded, adhered) to the structural support element 110, and the deformable medium 124 may be disposed within a cavity defined between the deformable element 122 and the structural support element 110. In this example, the outer periphery 130 of the deformable element 122 may define an edge seal to contain the deformable medium 124. A force distributor ring 140 may be positioned over the deformable element 122 proximate the outer periphery 130 of the deformable element 122.

Each of the structural support element 110, the deformable element 122, and the deformable medium 124 may be substantially transparent to allow light to pass therethrough to an eye of a user. Accordingly, at least portions of the structural support element 110 and the deformable optical element 120 may be positioned in an optical aperture of the optical lens assembly 100, which may refer to a portion of the optical lens assembly 100 that allows the passage of light to a user's eye.

The relational terms used herein, such as "first," "second," "over," "under," "on," "top," "downward," "upward," etc., may be used for clarity and convenience in understanding the disclosure and accompanying drawings, and may not necessarily connote or depend on any specific preference, orientation, or order, except where the context clearly indicates otherwise. In some examples, the phrase "substantially transparent" may refer to an element exhibiting greater than about 20% transmissivity and less than about 10% haze in the visible light spectrum. In some examples, the term "substantially," in reference to a given parameter, property, or condition, may generally refer to a degree that one of ordinary skill in the art would understand that the given parameter, property, or condition is met with a small degree of variance, such as within acceptable manufacturing tolerances. By way of example, depending on the parameter, property, or condition that is substantially met, the parameter, property, or condition may be at least 90% met, at least 95% met, at least 99% met, etc. In some examples, the phrase "deformable optical element" may refer to an element (including one or more materials or sub-elements) that is configured to be deformed to alter an optical property (e.g., an accommodative property or an adaptive optical property) of the optical lens assembly. In some examples, the term "accommodative" or "accommodation" may refer to changing an optical power. In some examples, the term "adaptive" may refer to tunability for providing control, compensation, and/or correction of wave front errors such as distortion and other aberration(s).

The structural support element 110, deformable optical element 120, and force distributor ring 140 may be coupled to a housing 150 (e.g., an eyeglass frame element, a VR headset frame element, etc.). In FIG. 1, the deformable element 122 and deformable medium 124 are shown in a neutral, non-actuated state. In the non-actuated state, an upper surface of the deformable element 122 may have a substantially planar shape, and the optical lens assembly 100 may be configured and positioned to not substantially alter an image or view passing through the optical lens assembly 100. In other words, the non-actuated state may be a zero-optical power state.

The structural support element 110 may be or include a substantially transparent material with a higher relative rigidity than the deformable element 122 and the deformable medium 124. By way of example, the structural support element 110 may be or include one or more of a glass material, a sapphire material, a crystal material (e.g., quartz), a polycarbonate material, another polymer material, or a non-polymeric material. The structural support element 110 may provide a protective barrier for the user's eye, for the deformable optical element 120, and for other components of the optical lens assembly 100 (e.g., a display element, an actuator, etc.). The structural support element 110 may also include an eye-tracking element, which may be configured for estimating an inter-pupillary distance of the user's eyes, a gaze distance, and/or a focal point. The eye-tracking element, if present, may include a selective-transmission element that transmits light having a selected property and that does not transmit light that does not have the selected property. For example, the structural support element 110 may include a coating or material that allows visible light to pass while reflecting non-visible light (e.g., infrared light). In this example, an infrared light source may direct infrared light to the structural support element 110, which may be reflected onto the user's eye. An infrared camera may detect infrared light that is reflected from the user's eye and back to the structural support element 110, to track the user's eye.

As shown in FIG. 1, the structural support element 110 may be a substantially planar element that does not substantially alter an image viewed through the structural support element 110. In other embodiments, the structural support element 110 may include a corrective ophthalmic lens (e.g., a positive-optical power (i.e., magnifying) lens, a negative-optical power (i.e., diminishing) lens, a lens for correction of an aberration, etc.), or another optical lens element. Optionally, an anti-reflective coating may be applied to the structural support element 110. The outer periphery 130 of the deformable element 122 may be directly or indirectly coupled to the structural support element 110, which may define a cavity therebetween for containing the deformable medium 124.

The deformable element 122 may include a substantially transparent, flexible film of a single material or multiple materials. By way of example and not limitation, the deformable element 122 may include at least one of a polymer material (e.g., a thermoset polymer, a thermoplastic polymer, an elastomer, etc.), a ceramic material, a glass material, a crystalline (e.g., substantially single-crystal) material, or a composite material.

The deformable medium 124 may be a substantially transparent material with mechanical properties that allow for deformation upon actuation of the optical lens assembly 100. By way of example and not limitation, the deformable medium 124 may be or include a gas (e.g., air, nitrogen, etc.), a liquid (e.g., water, saline solution, a high-refractive index liquid, etc.), a polymer material, a gel (e.g., a silicone gel), or a foam (e.g., a silica aerogel), etc.

FIG. 2 shows the optical lens assembly 100 in a convex actuated state, with the deformable element 122 being deformed to a desired shape (e.g., convex). The deformation of the deformable element 122 may result from a downward (in the perspective of FIGS. 1-3) actuation force 160 on the force distributor ring 140 from an actuator (e.g., an electromechanical actuator). In the view of FIG. 2, the force distributor ring 140 has been forced downward by the downward actuation force 160 to push a portion of the deformable medium 124 from proximate the outer periphery 130 into a central region of the deformable element 122, increasing a pressure proximate to the deformable element 122, and causing a central region of the deformable element 122 to bulge upward (in the perspective of FIG. 2).

Examples of electromechanical actuators that may be used to deform the deformable element 122 include, without limitation, a piezoelectric material or device, an electroactive polymer, an electrostrictive polymer, a shape memory alloy, a voice coil, a pneumatic actuator, an electromagnetic motor (including for example a servo motor, a stepper motor, a DC motor, or a similar motor), a hydraulic actuator, or a combination thereof. In some examples, the term "electroactive" may refer to a property of a material or composite material that deforms in response to an application of electrical energy (e.g., a voltage) and may generate electrical energy when strained or deformed. Example electroactive materials include piezoelectric materials, electrostrictor materials, dielectric elastomers, and ionic polymer conductors.

FIG. 3 shows the optical lens assembly 100 in a concave actuated state. As shown in this figure, an upward (in the perspective of FIGS. 1-3) actuation force 170 applied on the force distributor ring 140 by an actuator may deform the deformable optical element 120 to a concave shape. For example, upward movement of the force distributor ring 140 may result in a local low-pressure region near the outer periphery 130 of the deformable element 122, and portions of the deformable medium 124 may move from the central region of the deformable optical element 120 toward the outer periphery 130, causing the central region to have the concave shape. In this state, the optical lens assembly 100 may exhibit a negative optical power.

Figure 4:
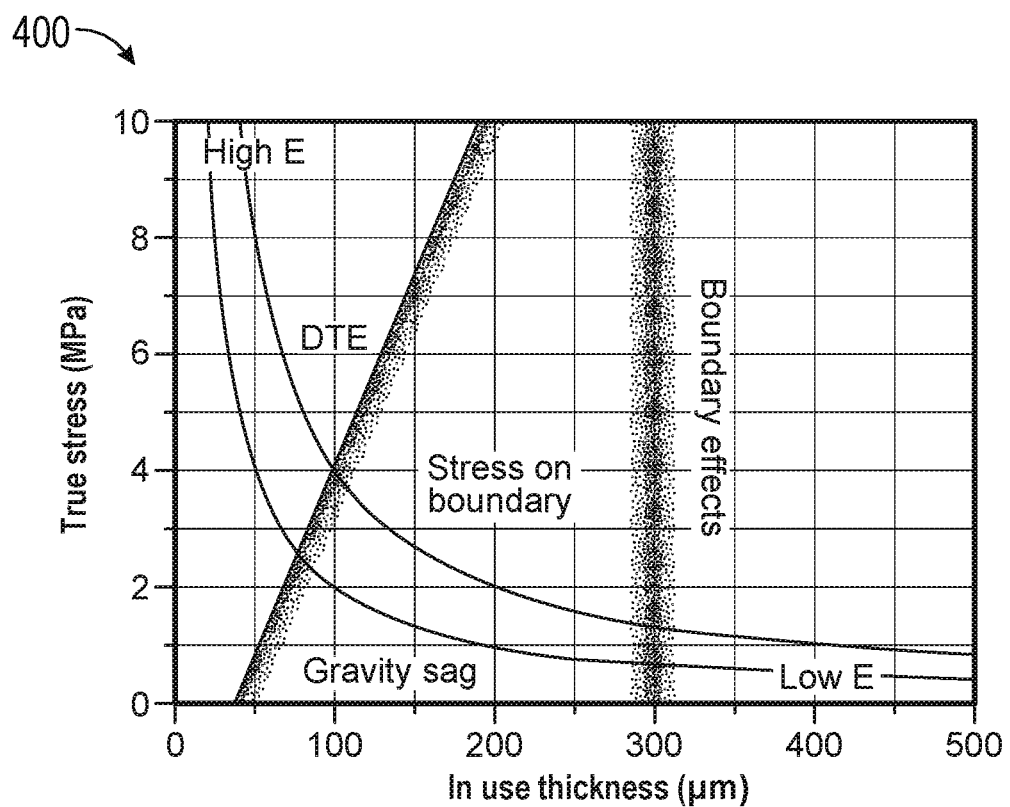
FIG. 4 is a graph illustrating stress on deformable elements of optical lens assemblies at different conditions and properties.

FIG. 4 is a graph 400 illustrating stress on deformable elements of optical lens assemblies at different conditions and properties. The graph 400 demonstrates certain considerations when selecting an appropriate material and configuration of deformable elements for optical lens assemblies, such as the optical lens assembly 100 illustrated in FIGS. 1-

3. As described above with reference to FIGS. 1-3, the deformable element 122 may be coupled (e.g., bonded, adhered) directly to the support structure 110 and the outer periphery 130 may define an edge seal for containing the deformable medium 124. In some examples, and depending on the material and configuration selected for the deformable element 122, the deformable element 122 may be pretensioned to achieve a desired profile and response to actuation and/or to reduce the negative effects of so-called "gravity sag." Gravity sag may refer to a lower portion of the deformable optical element 120 being thicker on average than an upper portion due to gravity urging the deformable element 122 and/or deformable medium 124 downward.

As illustrated in the graph 400 of FIG. 4, considerations such as gravity sag, stress on the boundary or interface between the deformable element 122 and the structural support element 110, differential thermal expansion ("DTE") between the deformable element 122 and the structural support element 110, and other boundary effects may be taken into account when selecting a material and configuration for the deformable element 122 when the deformable element 122 is coupled to the structural support element as illustrated in FIGS. 1-3. Stiffness (shown by the two curves labeled as 400 Nm$^{-1}$ and 200 Nm$^{-1}$), thickness, and/or elastic modulus ("E") of the deformable element 122 may affect these factors. Certain materials with a low E and in-use thicknesses of over about 300 µm, for example, may exhibit boundary effects that preclude their use as deformable elements 122 for some applications. Similarly, materials exhibiting a relatively high E and low in-use-thickness may be incompatible with some structural support element 110 materials due to the negative effects of differential thermal expansion, for example. Gravity sag and boundary stress concerns may also tend to limit selections of certain materials and configurations.

By way of example, in consideration of the factors discussed in relation to FIG. 4, certain elastomeric materials or hyperelastic materials may be selected for the deformable element 122 coupled to the structural support element 110 and forming the edge seal. In some examples, "hyperelastic" may refer to a material with a non-linear stress-strain relationship that elastically deforms under large strains. "Hyperelastic" materials include at least some elastomers, composites, nanocomposites, gels, and foams. Some elastomeric materials or hyperelastic materials may be capable of pretension to mitigate gravity sag and other issues, while experiencing low creep and reducing or avoiding the negative effects of potential differential thermal expansion between the deformable element 122 and the structural support element 110. Accordingly, materials and configurations with properties falling between the line marked "boundary effects" and the line marked "DTE" in FIG. 4 may be selected for the deformable element 122 that is coupled to the structural support element 110, as illustrated in FIGS. 1-3, for example.

Figure 5:
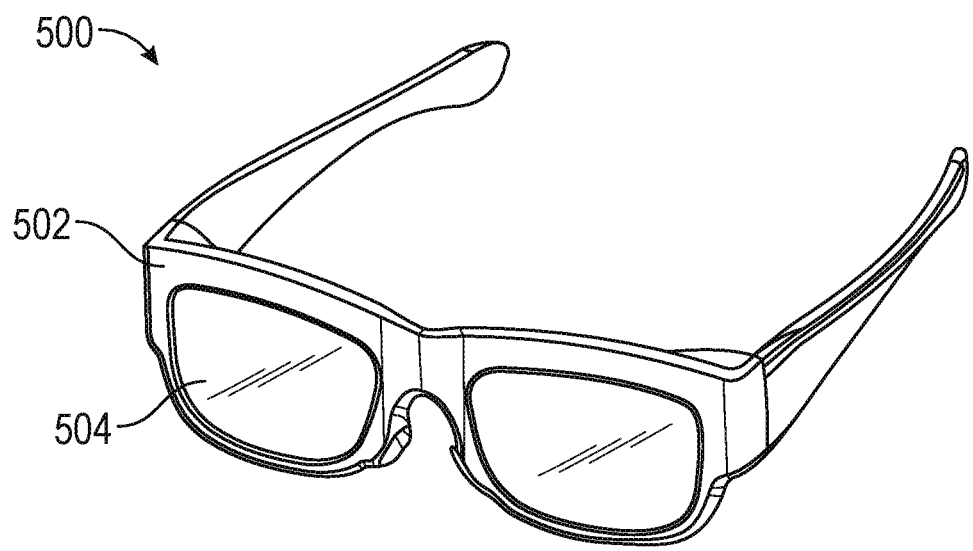
FIG. 5 is a perspective view of an HMD according to some embodiments of the present disclosure.

FIG. 5 illustrates an example HMD 500 (e.g., AR glasses, VR glasses) capable of incorporating the optical lens assemblies described herein. In one example, the HMD 500 may be dimensioned to be worn on a head of a user. The HMD 500 may include a frame element 502 for supporting at least one deformable optical lens assembly 504 according to the present disclosure. In some embodiments, the optical lens assembly(ies) 504 may be tailored to or selected in consideration of a particular user's eye. In addition to supporting the optical lens assembly(ies) 504, the frame element 502 may also support other elements, such as an actuator, a driver circuit for the actuator, a power supply element (e.g., a battery), a communication component (e.g., a component for communication via Wi-Fi, BLUETOOTH, near-field communications ("NFC"), etc.), a display element, a graphics processing unit for rendering an image on the display element, an image sensor (e.g., a camera), an eye-tracking element, etc. As shown in FIG. 5, the optical lens assembly 504 may have an asymmetric shape, although the optical lens assembly 504 may be formed in any of a variety of additional shapes (e.g., symmetric) and sizes. In addition, the HMD 500 may have a different shape and design than is shown in FIG. 5, such as in the form of a VR headset or another shape that suits user preferences or a particular application. The optical lens assembly 504 may be or include any of the optical lens assemblies or subassemblies described below with reference to FIGS. 6-25.

Figure 6:
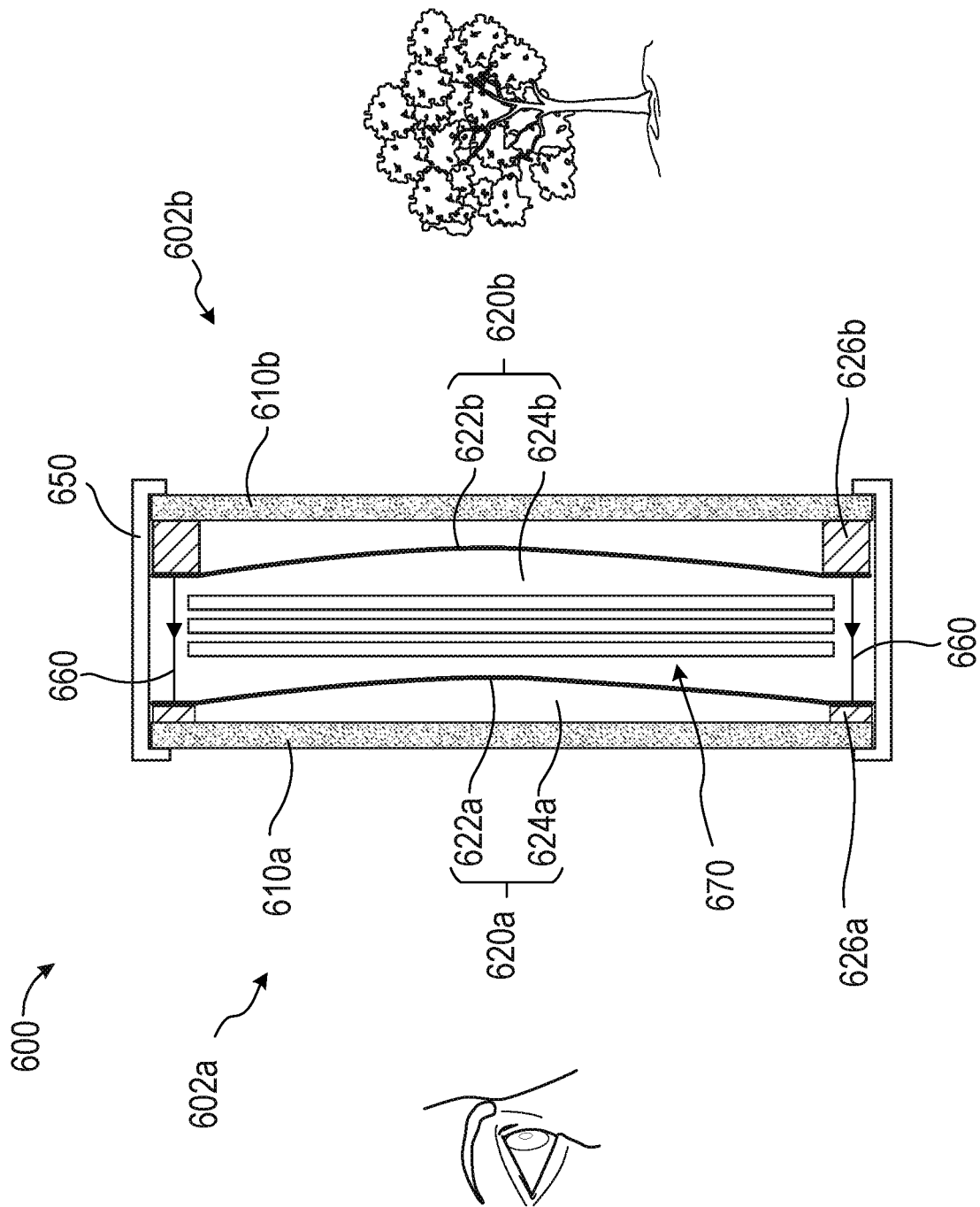
FIG. 6 is a cross-sectional side view of an optical lens assembly according to some embodiments of the present disclosure.

The compliant interface materials described herein may, in a variety of ways using a variety of techniques, mitigate negative aspects of conventional optical lens assemblies that include deformable elements coupled to support structures. FIG. 6 illustrates one such example of an optical lens assembly 600 in an actuated state. As shown in this figure, the optical lens assembly 600 may include a proximal optical lens subassembly 602a (also referred to as the "proximal subassembly 602a" for simplicity) for positioning close to a user's eye, and a distal optical lens subassembly 602b (also referred to as the "distal subassembly 602b for simplicity) for positioning away from the user's eye. The optical lens assembly 600 may also include a housing 650 (e.g., a frame element of an HMD) for supporting the optical lens subassemblies 602a, 602b, which may at least partially cover a peripheral edge of the optical lens subassemblies 602a, 602b. The housing 650 may support a display element 670 (e.g., an electronic display) for displaying an image to the user. The display element 670 may be positioned adjacent to and between the optical lens subassemblies 602a, 602b.

The proximal subassembly 602a may include a proximal structural support element 610a, a proximal deformable optical element 620a (including a proximal deformable element 622a and a proximal deformable medium 624a), and a proximal compliant interface material 626a. The proximal compliant interface material 626a may couple at least a portion of the proximal deformable element 622a to at least a portion of the proximal structural support element 610a. Accordingly, the proximal deformable element 622a may not be directly coupled to the proximal structural support element 610a, because the proximal complaint interface material 626a may prevent the proximal deformable element 622a from directly interfacing with any portion of the proximal structural support element 610a. Similarly, the distal subassembly 602b may include a distal structural support element 610b, a distal deformable optical element 620b (including a distal deformable element 622b and a distal deformable medium 624b), and a distal compliant interface material 626b coupling the distal deformable element 622b to the distal structural support element 610b. The proximal and distal compliant interface materials 626a, 626b are also collectively referred to as "the compliant interface materials 626."

The compliant interface materials 626 may be or include a material that exhibits properties that may facilitate a physical connection of the deformable elements 622a, 622b to the respective support structures 610a, 610b. For example, the compliant interface materials 626 may be or include a thermoset polymer material, an elastomeric material, a hyperelastic material, an elastic material, or a composite material. The compliant interface materials 626 may be configured to compensate for a difference between a physical property of the deformable elements 622a, 622b and the respective structural support elements 610a, 610b. For example, the compliant interface materials 626 may have an intermediate coefficient of thermal expansion, stiffness, applied pre-tension, modulus of elasticity, and/or electrical conductivity between that of the respective deformable elements 622a, 622b and support structures 610a, 610b. The compliant interface material may also be at least partially covered by the housing 650 of the optical lens assembly 600.

The presence of the compliant interface materials 626 between the deformable elements 622a, 622b and the respective structural support elements 610a, 610b may enable the selection of additional materials for the deformable elements 622a, 622b, compared to configurations in which deformable elements are directly coupled to respective structural support elements. For example, an elastic material may exhibit a relatively higher material stiffness than an elastomer or hyperelastic material, which may, in some embodiments, alleviate issues of gravity sag with little or no required pre-tensioning. With less pre-tensioning, less stress may be imposed on an outer periphery of the deformable optical elements 620a, 620b, which in some examples may reduce or prevent buckling failure modes in a corresponding force distribution ring. In addition, less force may be required for actuation.

In some embodiments, an electroactive material may be used for the deformable elements 622a, 622b. As detailed above, electroactive materials may function as transducers or as a component of transducers for actuating and deforming the deformable optical elements 620a, 620b. For example, substantially transparent dielectric elastomers, piezoelectrics including polymers like polyvinylidene fluoride ("PVDF") and its copolymers, and/or single crystal ceramics like lithium niobite, quartz, $K_{0.5}Na_{0.5}NbO_3$ ("KNN"), etc. are electroactive materials that may be included in the deformable elements 622a, 622b.

With dielectric elastomers or other forms of electroactive polymers, the deformable elements 622a, 622b may include rigid or semi-rigid structural materials for load bearing or for reducing or eliminating the level of pre-tension in the deformable elements 622a, 622b. In these cases, alternative architectures with a wider range of potential material selection, material geometries, and boundary conditions may improve performance and manufacturability. In addition, such improvements may not be possible in some embodiments that include an elastomeric or hyperelastic deformable element pre-tensioned to alleviate gravity sag, and directly coupled to the structural support element, as discussed above with reference to FIGS. 1-4.

In addition, as discussed above with reference to FIG. 4, structural problems resulting from a mismatch of physical properties of structural support elements and deformable elements, such as differential thermal expansion, may limit material selection for the deformable element. In some embodiments, the structural support element may be integrated with other optical components (e.g., eye-tracking elements, ophthalmic correction, etc.) and/or may be relatively thin and rigid. Thus, the selected material of the structural support element may be or include materials such as glass or sapphire with a coefficient of thermal expansion that may substantially deviate from those of the typically more compliant deformable element. Accordingly, the presence and configuration of the compliant interface materials 626 between and coupling the deformable elements 622a, 622b and the respective structural support elements 610a, 610b may alleviate the above-described concerns of physical property differences and may enable a wider selection of potential materials for the deformable elements 622a, 622b.

In some examples, the optical lens assembly 600 illustrated in FIG. 6 may be used to reduce or eliminate the negative impact of a phenomenon known as the "vergence-accommodation conflict." Traditional AR displays may attempt to create the illusion that a virtual object is set at a distance in the real-world environment by displaying virtual images to the left eye and to the right eye with a relative offset, such that a user's eyes converge on the desired real-world focal point to align the left- and right-side virtual images. At the same time, the user's left and right eyes also undergo accommodation to bring the respective left- and right-side virtual images into focus. However, the distance of the real-world focal point may frequently differ from the distance of the augmented-reality display, causing a difference between the apparent vergence distance and the apparent accommodation distance of a virtual object. Unfortunately, because the human visual system is adapted to the expectation that the apparent vergence distance and the apparent accommodation distance of a real-world object will match, the mismatch frequently posed by traditional augmented reality systems may confuse a user's vision, potentially breaking a sense of immersion—or even causing severe physical discomfort.

The optical lens assembly 600 illustrated in FIG. 6 may be configured to address the vergence-accommodation conflict. For example, an actuation force 660 is shown in FIG. 6 as being applied in a direction toward the user's eye, such that the proximal deformable optical element 620a forms a convex shape and the distal deformable optical element 620b forms a concave shape. Conversely, if the actuation force 660 is applied in a direction away from the user's eye, the proximal deformable optical element 620a may form a concave shape and the distal deformable optical element 620b may form a convex shape. Upon actuation in either direction, the proximal deformable optical element 620a may be configured to adjust the user's view of an image rendered on the display element 670. The distal deformable optical element 620b may be configured to counteract the adjustments of the proximal deformable optical element 620a with respect to the user's view of a surrounding real-world environment. In other words, the two deformable optical elements 620a, 620b may together modify the apparent accommodation distance of a virtual object or scene shown on the display element 670, while reducing or eliminating any distortion of the appearance of the real-world environment through the optical lens assembly 600.

Figure 7:
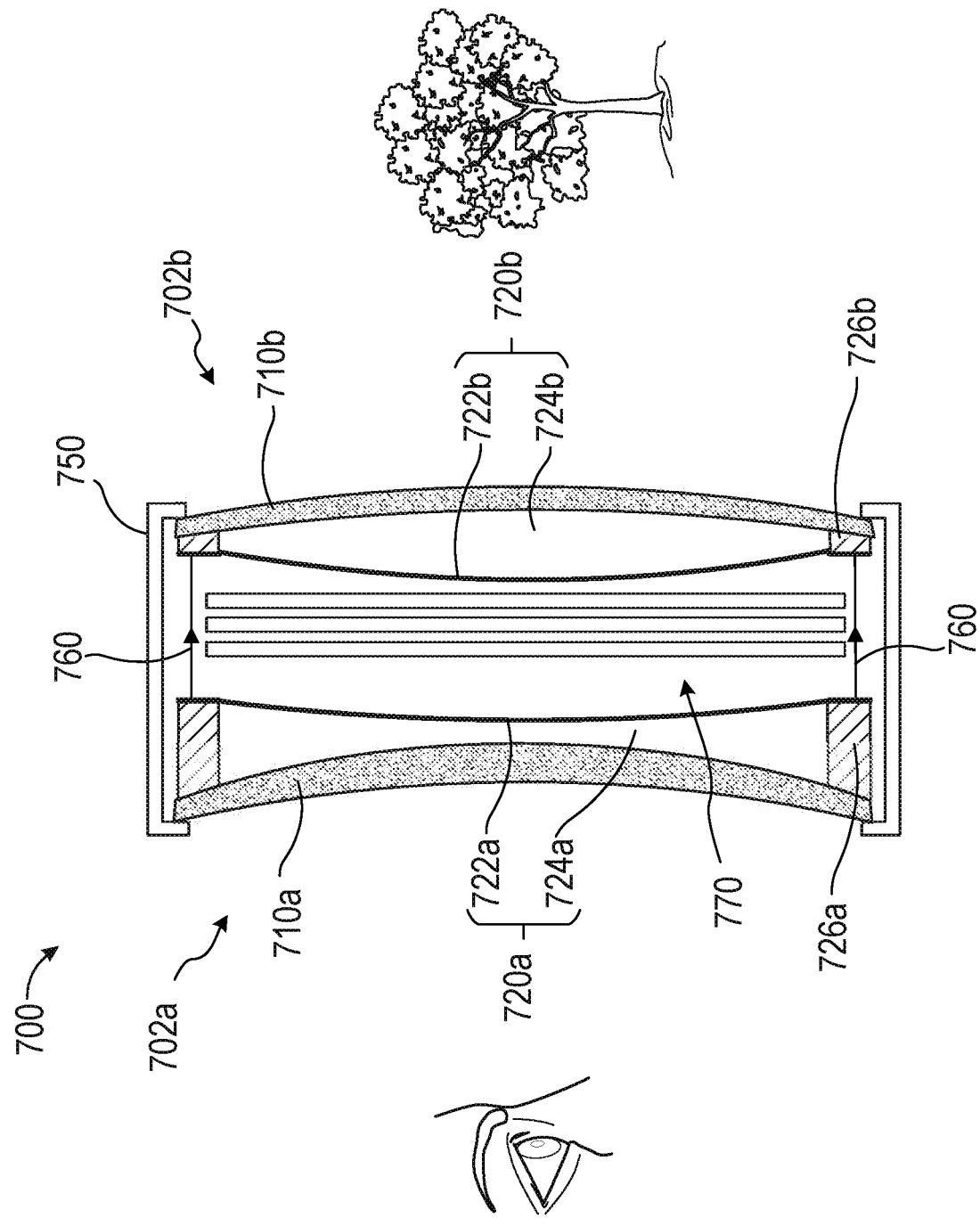
FIG. 7 is a cross-sectional side view of an optical lens assembly according to other embodiments of the present disclosure.

FIG. 7 shows an embodiment of an optical lens assembly 700 similar to the optical lens assembly 600 described above with reference to FIG. 6, but with a curved proximal structural support element 710a and a curved distal structural support element 710b, rather than the substantially planar structural support elements 610a, 610b of FIG. 6. For example, one or both of the proximal and distal structural support elements 710a, 710b may be or include a corrective ophthalmic lens, or a curved zero-optical power lens (e.g., a zero-power meniscus lens). A shape of the proximal and/or distal structural support elements 710a, 710b may, in some embodiments, be tailored to or selected in consideration of a specific user to correct vision impairments or to otherwise meet user preferences. A zero-optical power curved lens may provide some advantages over a substantially planar lens, such as improved anti-reflective properties and/or improved fit to a user's facial contours.

In some examples, for realization of a sub-assembly with similar functionality to the sub-assembly in FIG. 6, the proximal and distal structural support elements 710a, 710b in FIG. 7 can be zero-power meniscus lens elements for improved anti-reflective properties and easier integration with potentially non-flat optical eye-tracking and/or ophthalmic optical elements at the proximal structural support element 710a.

The optical lens assembly 700 may include a proximal optical lens subassembly 702a and a distal optical lens subassembly 702b. The proximal optical lens assembly 702a may include the proximal support structure 710a, a proximal deformable optical element 720a (including a proximal deformable element 722a and a proximal deformable medium 724a), and a proximal compliant interface material 726a coupling the proximal deformable element 722a to the proximal structural support element 710a and forming an edge seal. The distal optical lens assembly 702b may include the distal support structure 710b, a distal deformable optical element 720b (including a distal deformable element 722b and a proximal deformable medium 724b), and a distal compliant interface material 726b coupling the distal deformable element 722b to the distal support structure 710b and forming an edge seal. A display element 770 and the optical lens subassemblies 702a, 702b may be mounted on a housing 750.

FIG. 7 illustrates the optical lens assembly 700 in an actuated state. For example, an actuation force 760 may act on the deformable elements 722a, 722b to deform the deformable optical elements 720a, 720b. In this example, the actuation force 760 is shown as being applied away from the user's eye, such that the proximal deformable optical element 720a forms a concave shape and the distal deformable optical element 720b forms a convex shape. In addition, the actuation force 760 may be applied toward the user's eye, which may result in the proximal deformable optical element 720a forming a convex shape and the distal deformable optical element 720b forming a concave shape. As discussed above with reference to FIG. 6, the optical lens assembly 700 may be configured to address the vergence-accommodation conflict.

Figure 8:
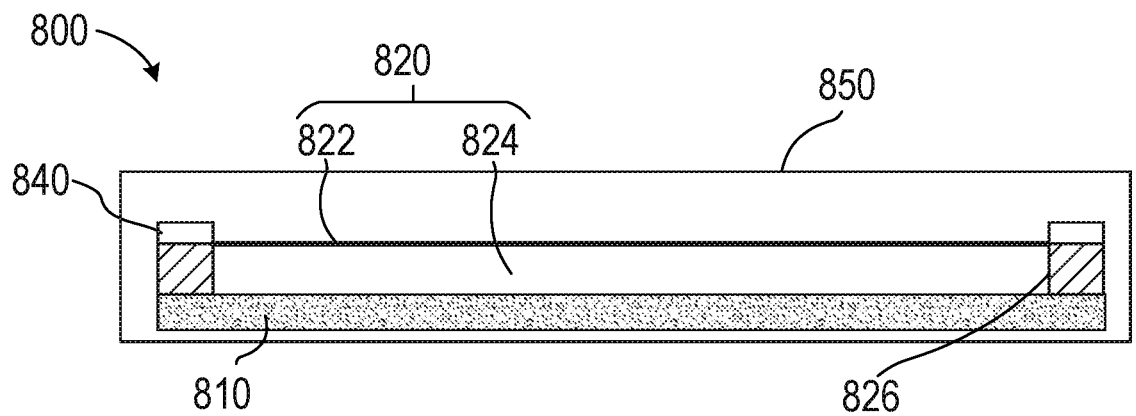
FIGS. 8-10 are cross-sectional side views of an optical lens assembly according to some embodiments of the present disclosure, respectively in a neutral, non-actuated state, in a convex actuated state, and in a concave actuated state.
Figure 9:
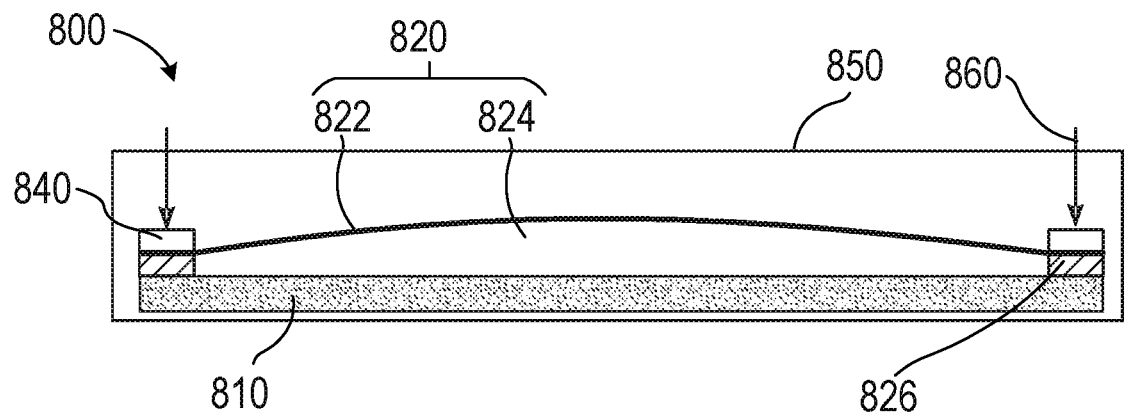
Figure 10:
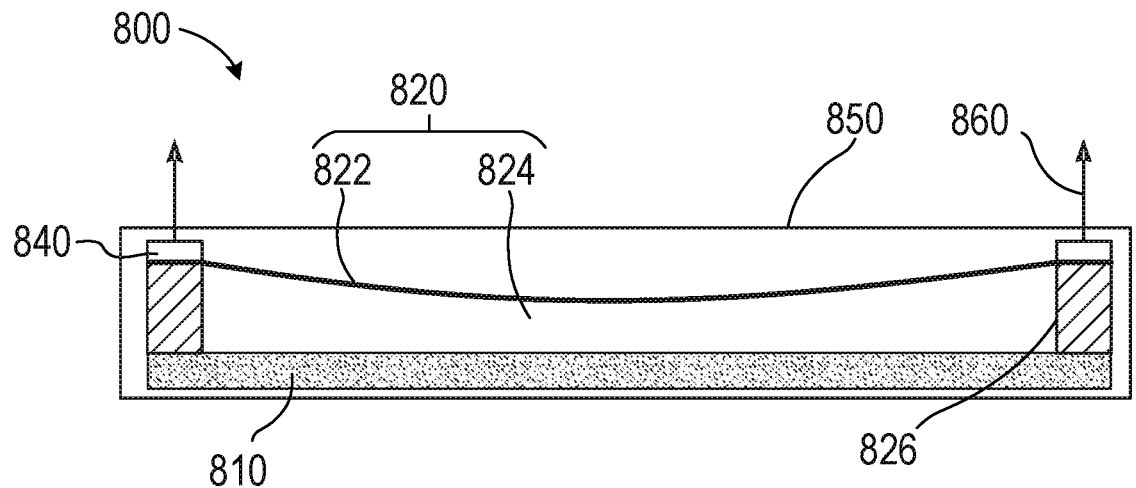

FIGS. 8-25 illustrate additional embodiments of optical lens assemblies that may include a compliant interface material between and coupling respective deformable elements and structural support elements. Referring to FIGS. 8-10, an optical lens assembly 800 may include a structural support element 810, a deformable optical element 820 that may include a deformable element 822 and a deformable medium 824, a compliant interface material 826 coupling the deformable element 822 to the structural support element 810, a force distributor ring 840 positioned along (e.g., abutting against, coupled to) an outer periphery of the deformable element 822, and a housing 850 for supporting the other components of the optical lens assembly 800. The compliant interface material 826 may be disposed along a peripheral edge region of the deformable element 822 and/or of the structural support element 810 to form an edge seal for containing the deformable medium 824 within a cavity defined between the structural support element 810 and the deformable element 822. FIG. 8 illustrates the optical lens assembly 800 in a neutral, non-actuated state, in which the deformable element 822 is substantially planar and the optical lens assembly 800 may be in a zero-optical power state.

As shown in FIG. 9, upon application of a downward (in the perspective of FIGS. 8-10) actuation force 860 on the force distributor ring 840, the deformable optical element 820 may be deformed into a convex shape, such as for a positive-optical power state. In this example, the compliant interface material 826 may be compressed in a direction of the actuation force 860. Portions of the deformable medium 824 may be displaced (e.g., flow) radially inward from proximate the compliant interface material 826 toward a central region of the optical lens assembly 800.

As shown in FIG. 10, upon application of an upward (in the perspective of FIGS. 8-10) actuation force 860 on the force distributor ring 840, the deformable optical element 820 may be deformed into a concave shape, such as for a negative-optical power state. In this example, the compliant interface material 826 may expand in a direction of the actuation force 860. Portions of the deformable medium 824 may flow radially outward from the central region of the optical lens assembly 800 toward the compliant interface material 826.

Figure 11:
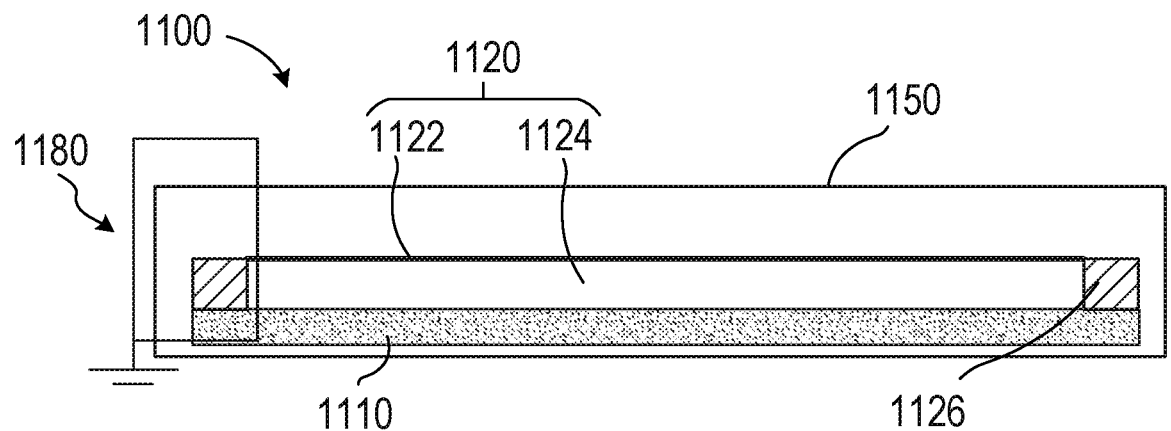
FIGS. 11-13 are cross-sectional side views of an optical lens assembly according to other embodiments of the present disclosure, respectively in a neutral, non-actuated state, in a convex actuated state, and in a concave actuated state.
Figure 12:
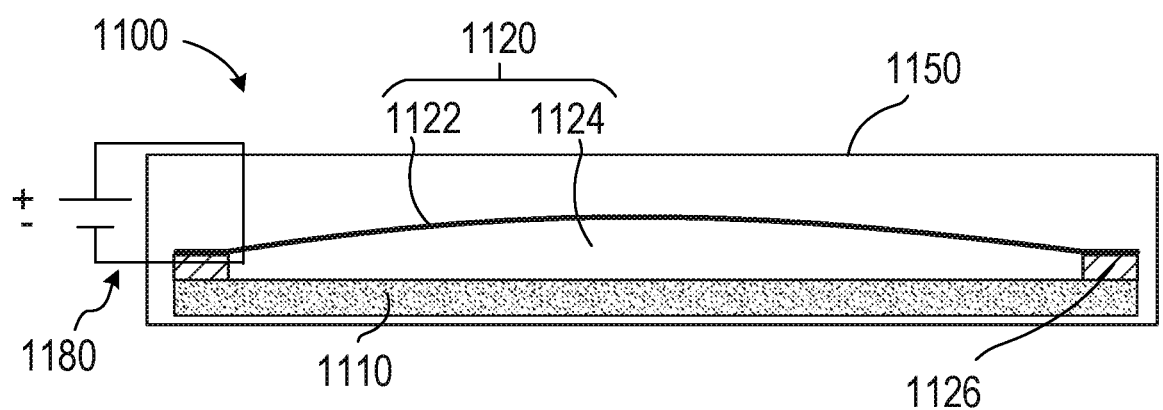
Figure 13:
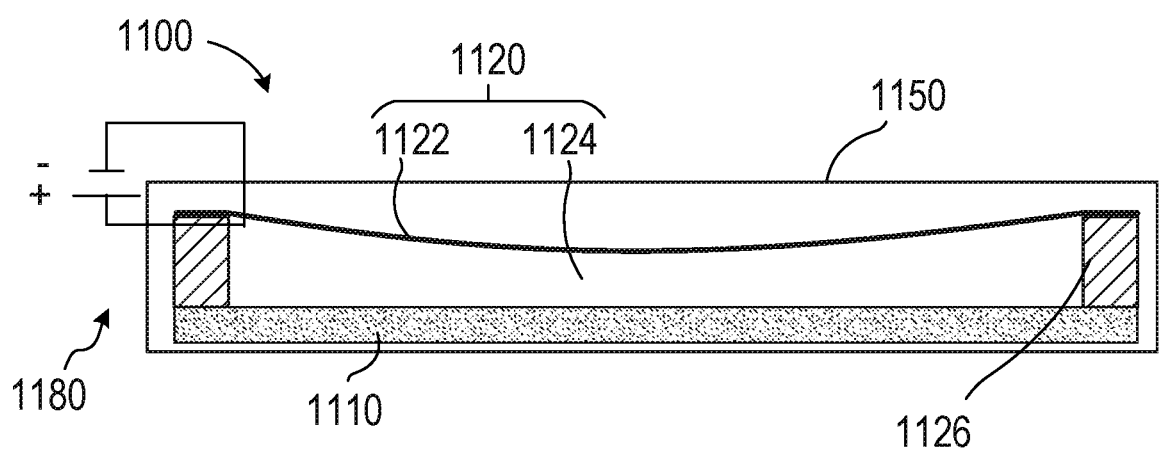

Referring to FIGS. 11-13, an optical lens assembly 1100 may include a structural support element 1110, a deformable optical element 1120 that may include a deformable element 1122 and a deformable medium 1124, a compliant interface material 1126 coupling the deformable element 1122 to the structural support element 1110, and a housing 1150 for supporting the other components of the optical lens assembly 1100. The compliant interface material 1126 may be disposed along a peripheral edge region of the deformable element 1122 and/or of the structural support element 1110 to form an edge seal for containing the deformable medium 1124 within a cavity defined between the structural support element 1110 and the deformable element 1122.

The deformable element 1122 may include an electroactive material. For example, the deformable element 1122 may include a single electroactive material or a stack of multiple electroactive materials. In some examples, the deformable element 1122 may also include one or more electrically passive structural support materials and/or one or more electrodes. A driver circuit 1180 may be operatively coupled to the deformable element 1122, such as via electrodes (e.g., substantially transparent electrodes) on opposing sides of the electroactive material of the deformable element 1122. Accordingly, the deformable element 1122 may function as an actuator (e.g., transducer) for deforming, and thus changing an optical power of, the deformable optical element 1120. FIG. 11 illustrates the optical lens assembly 1100 in a neutral, non-actuated state without any application of a voltage by the driver circuit 1180, in which the deformable element 1122 is substantially planar and the optical lens assembly 1100 may be in a zero-optical power state.

As shown in FIG. 12, upon application of a sufficient voltage by the driver circuit 1180, the deformable optical element 1120 may be deformed into a convex shape, such as for a positive-optical power state. In this example, the compliant interface material 1126 may be compressed in a downward (in the perspective of FIGS. 11-13) direction. Portions of the deformable medium 1124 may flow radially inward from proximate the compliant interface material 1126 toward a central region of the optical lens assembly 1100.

As shown in FIG. 13, upon application of sufficient voltage of an opposite polarity (compared to the example shown in FIG. 12), the deformable optical element 1120 may be deformed into a concave shape, such as for a negative-optical power state. In this example, the compliant interface material 1126 may expand in an upward (in the perspective of FIGS. 11-13) direction. Portions of the deformable medium 1124 may flow radially outward from the central region of the optical lens assembly 1100 toward the compliant interface material 1126.

Figure 14:
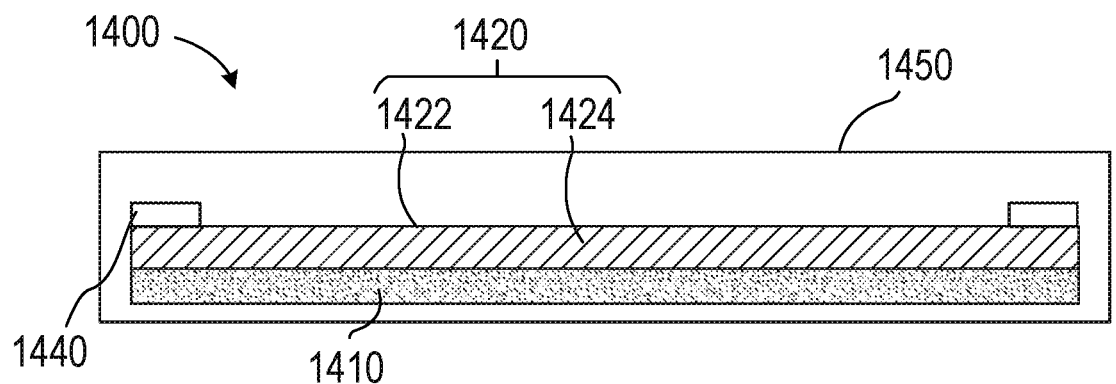
FIGS. 14-16 are cross-sectional side views of an optical lens assembly according to additional embodiments of the present disclosure, respectively in a neutral, non-actuated state, in a convex actuated state, and in a concave actuated state.
Figure 15:
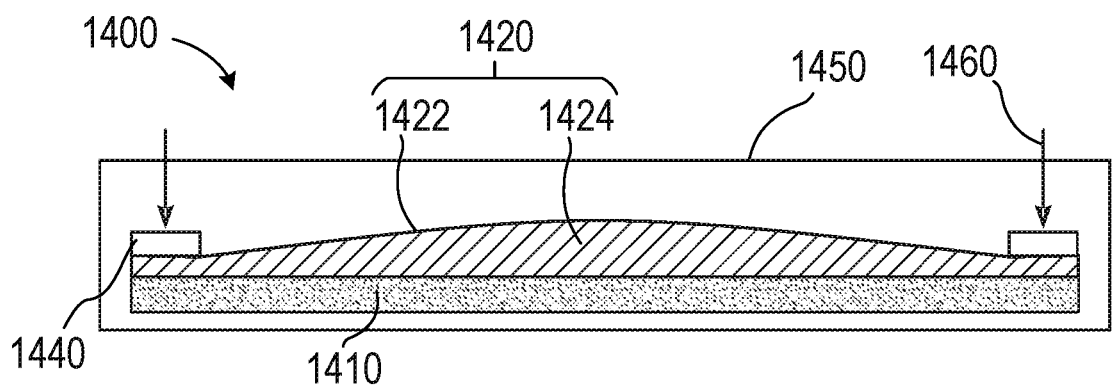
Figure 16:
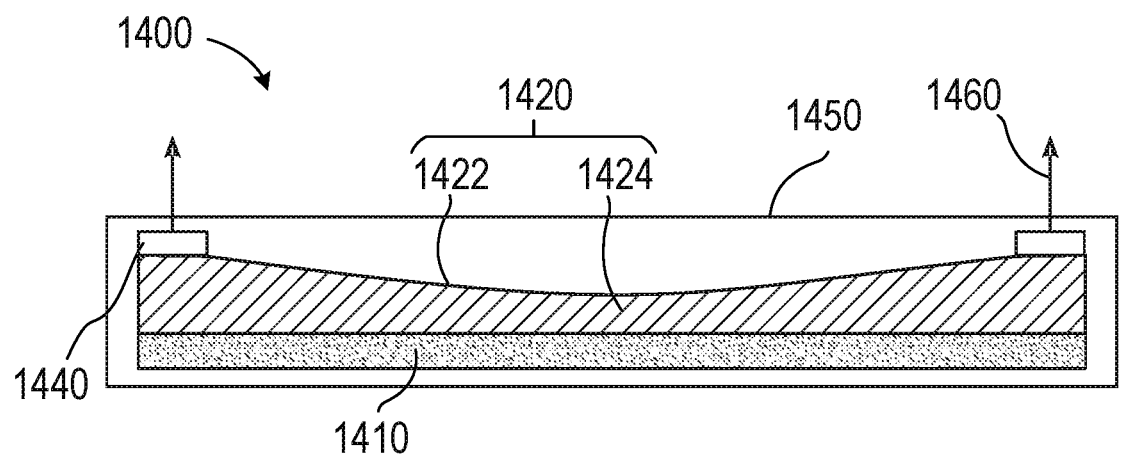

Referring to FIGS. 14-16, an optical lens assembly 1400 may include a structural support element 1410, a deformable optical element 1420 that may include a deformable element 1422 and a compliant interface material 1424, a force distributor ring 1440 positioned along (e.g., abutting against, adhered to) an outer periphery of the deformable element 1422, and a housing 1450 for supporting the other components of the optical lens assembly 1400. In this example, the compliant interface material 1424 may be or include a substantially transparent deformable medium disposed between the structural support element 1410 and the deformable element 1422. The compliant interface material 1424 may be disposed along substantially an entire surface area of the deformable element 1422 and/or of the structural support element 1410. The compliant interface material 1424 may couple the deformable element 1422 to the structural support element 1410. The compliant interface material 1424 may be or include a gel (e.g., a silicone gel), a hyperelastic polymer, a foam (e.g., a silicone aerogel), or an elastomeric polymer, etc. with sufficient elasticity to deform to a desired shape and resulting optical power. The compliant interface material 1424 may, in some embodiments, exhibit a physical property (e.g., coefficient of thermal expansion) between that of the deformable element 1422 and the structural support element 1410. FIG. 14 illustrates the optical lens assembly 1400 in a neutral, non-actuated state, in which the deformable element 1422 is substantially planar and the optical lens assembly 1400 may be in a zero-optical power state.

As shown in FIG. 15, upon application of a downward (in the perspective of FIGS. 14-16) actuation force 1460 on the force distributor ring 1440, the deformable optical element 1420 may be deformed into a convex shape, such as for a positive-optical power state. In this example, outer portions of the compliant interface material 1424 may be compressed in a downward (in the perspective of FIGS. 14-16) direction. Central portions of the compliant interface material 1424 may expand upward (in the perspective of FIGS. 14-16) direction to result in the convex shape.

As shown in FIG. 16, upon application of an upward (in the perspective of FIGS. 14-16) actuation force 1460 on the force distributor ring 1440, the deformable optical element 1420 may be deformed into a concave shape, such as for a negative-optical power state. In this example, outer portions of the compliant interface material 1424 may expand in an upward (in the perspective of FIGS. 14-16) direction. Central portions of the compliant interface material 1424 may compress downward (in the perspective of FIGS. 14-16) direction to result in the concave shape.

Figure 17:
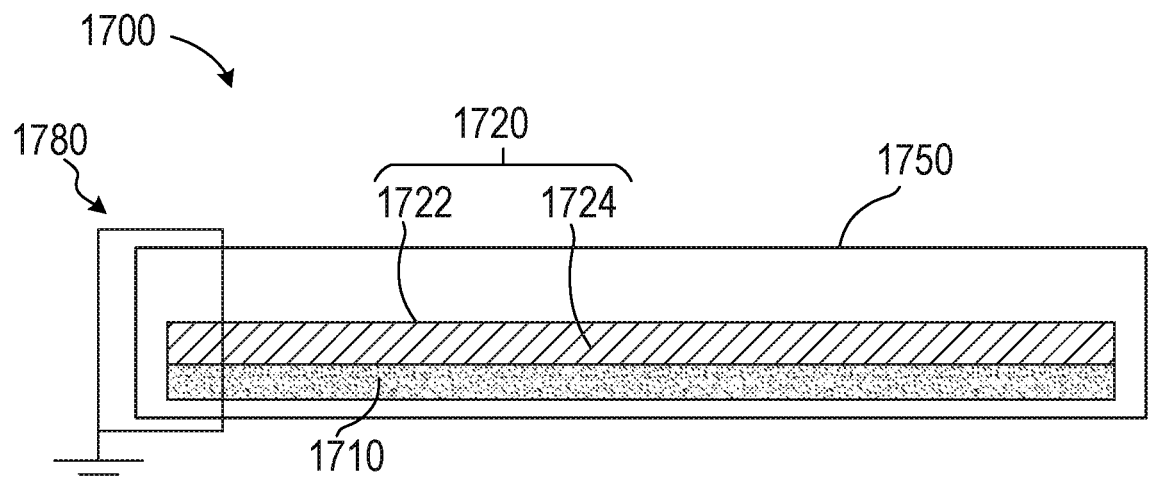
FIGS. 17-19 are cross-sectional side views of an optical lens assembly according to further embodiments of the present disclosure, respectively in a neutral, non-actuated state, in a convex actuated state, and in a concave actuated state.
Figure 18:
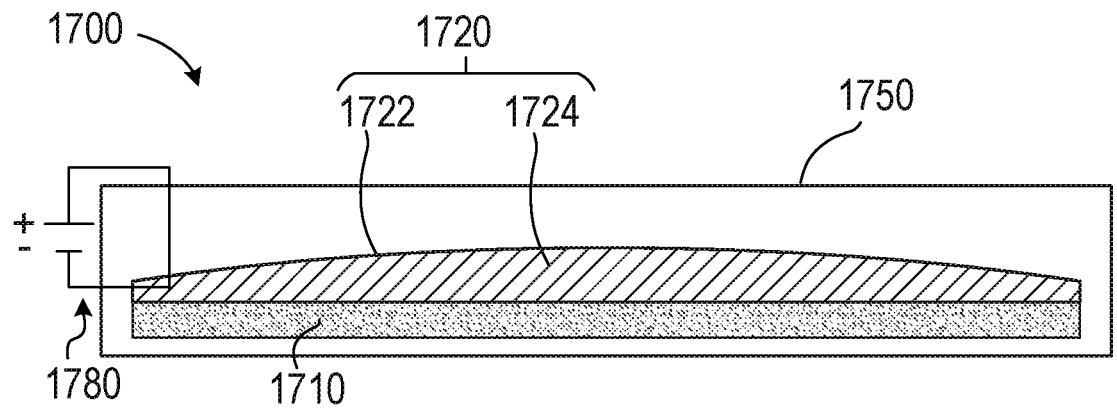
Figure 19:
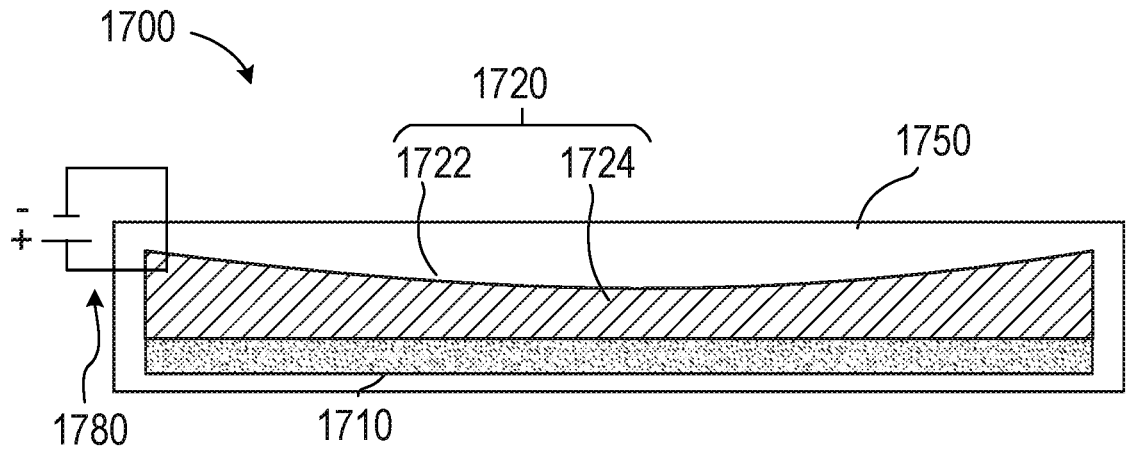

Referring to FIGS. 17-19, an optical lens assembly 1700 may include a structural support element 1710, a deformable optical element 1720 that may include a deformable element 1722 and a compliant interface material 1724, and a housing 1750 for supporting the other components of the optical lens assembly 1700. In this example, the compliant interface material 1724 may be or include a substantially transparent deformable medium disposed between the structural support element 1710 and the deformable element 1722. The compliant interface material 1724 may be disposed along substantially an entire surface area of the deformable element 1722 and/or of the structural support element 1710. The compliant interface material 1724 may couple the deformable element 1722 to the structural support element 1710. The compliant interface material 1724 may, in some embodiments, exhibit a physical property (e.g., coefficient of thermal expansion) that is between that of the deformable element 1722 and the structural support element 1710. The compliant interface material 1724 may be or include a gel (e.g., a silicone gel), a hyperelastic polymer, a foam (e.g., a silicone aerogel), or an elastomeric polymer, etc. with sufficient elasticity to deform to a desired shape and resulting optical power.

The deformable element 1722 may include an electroactive material. For example, the deformable element 1722 may include a single electroactive material or a stack of multiple electroactive materials. In some examples, the deformable element 1722 may also include one or more electrically passive structural support materials and/or one or more electrodes. A driver circuit 1780 may be operatively coupled to the deformable element 1722, such as via electrodes (e.g., substantially transparent electrodes) on opposing sides of the electroactive material of the deformable element 1722. Accordingly, the deformable element 1722 may function as an actuator (e.g., transducer) for deforming, and thus changing an optical power of, the deformable optical element 1720. FIG. 17 illustrates the optical lens assembly 1700 in a neutral, non-actuated state without any application of a voltage by the driver circuit 1780, in which the deformable element 1722 is substantially planar and the optical lens assembly 1700 may be in a zero-optical power state.

As shown in FIG. 18, upon application of a sufficient voltage by the driver circuit 1780, the deformable optical element 1720 may be deformed into a convex shape, such as for a positive-optical power state. In this example, outer portions of the compliant interface material 1724 may be compressed a downward (in the perspective of FIGS. 17-19) direction. Central portions of the compliant interface material 1724 may expand in an upward (in the perspective of FIGS. 17-19) direction to result in the convex shape.

As shown in FIG. 19, upon application of sufficient voltage of an opposite polarity (compared to FIG. 18), the deformable optical element 1720 may be deformed into a concave shape, such as for a negative-optical power state. In this example, outer portions of the compliant interface material 1724 may expand in an upward (in the perspective of FIGS. 17-19) direction. Central portions of the compliant interface material 1724 may compress in a downward (in the perspective of FIGS. 17-19) direction to result in the concave shape.

Figure 20:
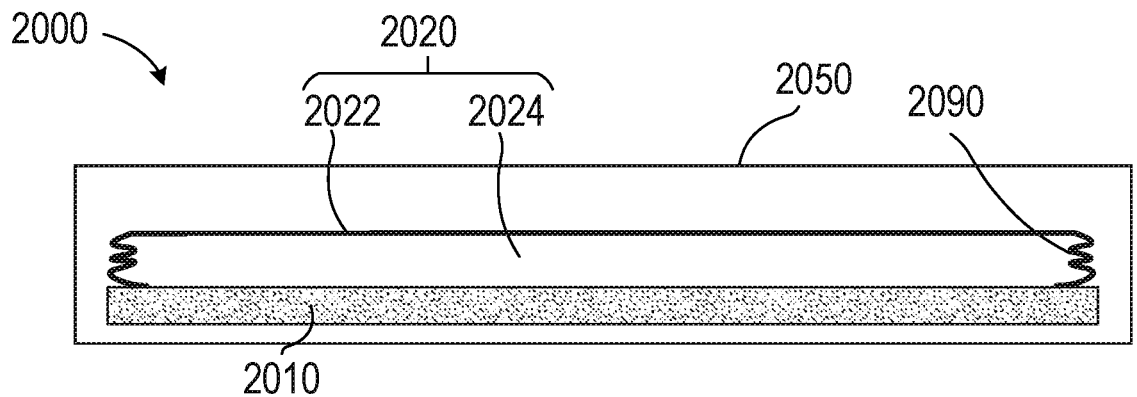
FIGS. 20-22 are cross-sectional side views of an optical lens assembly according to some embodiments of the present disclosure, respectively in a neutral, non-actuated state, in a convex actuated state, and in a concave actuated state.
Figure 21:
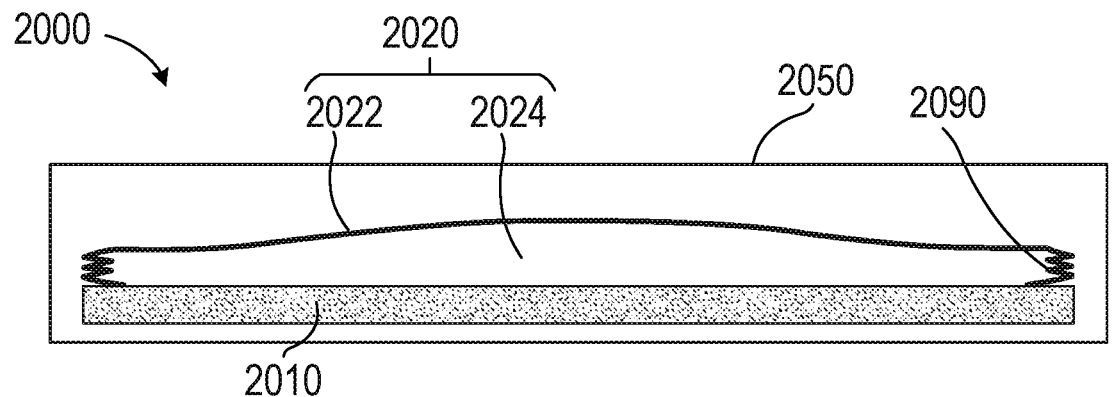
Figure 22:
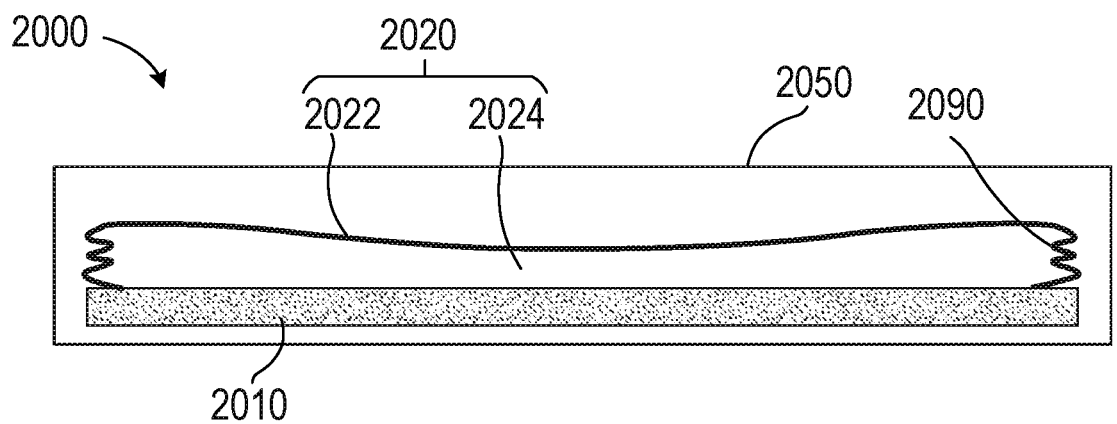

Referring to FIGS. 20-22, an optical lens assembly 2000 may include a structural support element 2010, a deformable optical element 2020 that may include a deformable element 2022 and a deformable medium 2024, and a housing 2050 for supporting the other components of the optical lens assembly 2000. In this example, a compliant interface material 2090 in the form of a bellows seal may couple the deformable element 2022 to the structural support element 2010. The compliant interface material 2090 may form an edge seal for containing the deformable medium 2024 in a cavity defined between the structural support element 2010 and the deformable element 2022. The compliant interface material 2090 may form an expansible and compressible joint, which may absorb expansion and contraction introduced via a differential thermal expansion of the structural support element 2010 and the deformable element 2022, for example. Various embodiments of the optical lens assembly 2000 may be actuated by, for example, an actuator applying a force on a force distributor ring or by an electroactive material of the deformable element 2022 actuated by a driver circuit, as described above.

FIG. 20 illustrates the optical lens assembly 2000 in a neutral, non-actuated state, in which the deformable optical lens assembly 2020 is in a substantially planar state. FIG. 21 illustrates the optical lens assembly 2000 in a convex actuated state, in which the compliant interface material 2090 has been compressed and a central portion of the deformable medium 2024 has been expanded. FIG. 22 illustrates the optical lens assembly 2000 in a concave actuated state, in which the compliant interface material 2090 has been expanded and a central portion of the deformable medium 2024 has been compressed.

In some embodiments, the compliant interface material may be or include a hyperelastic or elastomeric material. With an isotropic hyperelastic or elastomeric compliant interface material (i.e., exhibiting material properties that do not depend on direction), downward (e.g., in the perspective of FIGS. 8-22) movement of deformable elements by a force distributor ring, for example, may result in compression of the hyperelastic or elastomeric compliant interface material. In embodiments actuated by a deformable element including an electroactive material, for example, a bending moment may be applied to the compliant interface material corresponding to both loading in multiple directions. For an isotropic hyperelastic or elastomeric compliant interface element, such a multidirectional loading may result in both radial and vertical (in the perspective of FIGS. 8-22) displacement. Since optical power variation may be achieved through curvature defined vertically, in some applications it may be desirable to constrain deflection to the vertical direction. Therefore, in such embodiments it may be desirable to control (e.g., reduce or eliminate) transverse displacement of the compliant interface material.

Accordingly, in some embodiments, the compliant interface material may include an anisotropic material that is stiffer laterally (compared to vertically) to improve constraint of deflection to vertical. Example anisotropic materials include elastomeric composites. For example, hyperelastic or elastomeric materials including a fiber or nanomaterial reinforcement, such as carbon, glass, or thermoplastics may be configured to be anisotropic. In some examples, "anisotropic" may refer to a directionally dependent, non-uniform property (e.g., shape, stiffness, etc.).

An example section of a fiber-reinforced hyperelastic or elastomeric compliant interface material 2300 is shown in FIG. 23. The compliant interface material 2300 may include fibers 2302 in an elastomeric matrix 2304. By way of example and not limitation, the fibers 2302 may include glass fibers, carbon fibers, thermoplastic fibers, etc.

FIGS. 24 and 25 show an embodiment of an optical lens assembly 2400 in which the fiber-reinforced elastomer compliant interface material 2300 may be used as an edge seal between a structural support element 2410 and a deformable optical element 2420 (including a deformable element 2422 and a deformable medium 2424) in a neutral, non-actuated state (FIG. 24) and an actuated state (FIG. 25). As described above, actuation may occur from a force applied by an electromechanical actuator to a force distributor ring or through application of a voltage to an electroactive material of the deformable element 2422, for example.

The alignment of the fibers in the compliant interface material 2300 may result in anisotropic material properties with higher lateral stiffness than vertical stiffness (from the perspective of FIGS. 24 and 25). Edge deformation of the deformable optical element 2420 may therefore be more constrained to vertical compression and expansion, as opposed to lateral deviation. Other potential anisotropic materials include, for example, polymer foams, gels, gel composites, etc. In a composite material, composition and configuration control allows for stiffness tunability, and therefore adjustment, of an edge boundary condition, as desired.

The process to produce a compliant interface material may be a thermoset process. Prepolymer or resin may be first molded to shape via spin casting or reactive injection, extrusion, or compression molding, and then cured. For rubbers, the curing process may be performed with vulcanization. In some thermosets, cross-linking may be initiated with copolymerization, catalysts, dilutents, and/or heat and then cured through heat or radiation. Thermoset composites may be processed similarly with changes to the molding process, for example. Fiber reinforced thermosets may be molded via pultrusion, filament winding, wet layup, or resin transfer molding. Uniaxial fiber alignment may be accomplished via pultrusion, with more complex alignments possible with filament winding, wet layup, or resin transfer molding. The edge seal form factor of the compliant interface material, such as the compliant interface material 2300 shown in FIGS. 23-25, may be accomplished via a filament winding process, for example.

Once cured, thermoset polymers may be irreversibly set and can be highly temperature- and chemical-resistant. The compliant interface material may be bonded to the structural support element using an adhesive and/or primer(s) that may be cured via pressure, exposure to heat, exposure to light (e.g., ultraviolet light), and/or chemical reaction (e.g., epoxy, solvent evaporation, etc.). The method for assembling the deformable optical element, compliant interface material, and structural support element may involve the use of primer(s) and/or adhesive(s) between the structural support element and the compliant interface element. Depending on the selected materials, the compliant interface element and the deformable optical element may be bonded thermoset-to-non-polymer, thermoset-to-thermoset, or thermoset-to-thermoplastic, for example. An adhesive and/or primer may be used between the compliant interface material and the deformable optical element.

Figure 26:
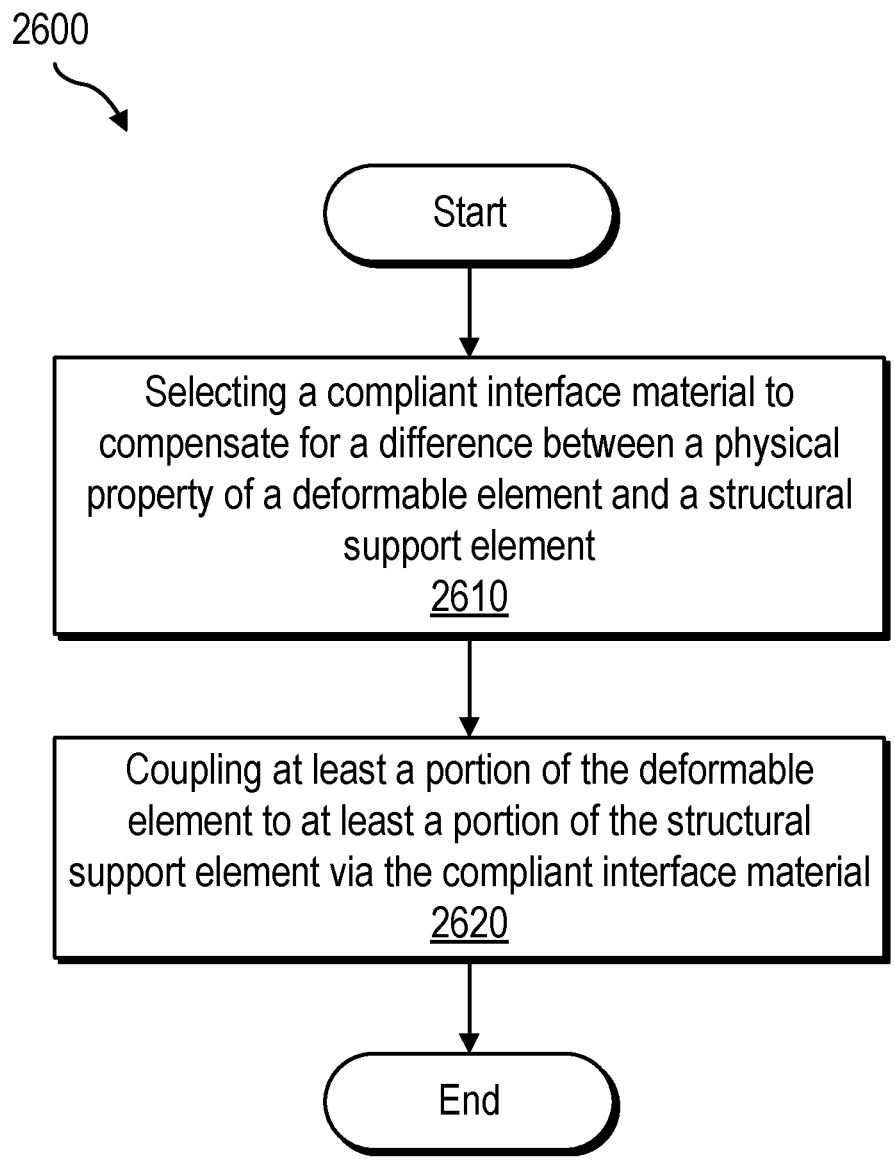
FIG. 26 is a flow diagram of a method for fabricating an optical lens assembly according to some embodiments of the present disclosure.

FIG. 26 is a flow chart illustrating a method 2600 of fabricating an optical lens assembly according to embodiments of the present disclosure. In operation 2610, a compliant interface material may be selected to compensate for a difference between a physical property (e.g., coefficient of thermal expansion, stiffness, applied pre-tension, modulus of elasticity, electrical conductivity, etc.) of a deformable element and a structural support element of an optical lens assembly.

In operation 2620, at least a portion of the deformable element may be coupled to at least a portion of the structural support element via the compliant interface material. The selected means for coupling the deformable element to the structural support element may depend on material selected for the deformable element, compliant interface material, and/or the structural support element. For example, a pressure may be applied to at least one of the deformable element, the compliant interface material, or the structural support element to couple the deformable element to the structural support element. In additional examples, at least one of the deformable element, the compliant interface material, or the structural support element may be heated. Further examples include exposing at least one of the deformable optical element, the compliant interface material, or the structural element to light radiation. In some examples, an epoxy material may be applied between at least one of the deformable element and the compliant interface material, or the compliant interface material and the structural support element.

In some examples, the compliant interface material may be formed by molding at least one of a monomer or a prepolymer and curing the molded monomer or prepolymer. A filler material (e.g., a fiber material, a nanomaterial) may be provided in a volume of the monomer or prepolymer prior to curing. A primer or an adhesive may be positioned between the cured monomer or prepolymer and the deformable element. Alternatively or additionally, a primer or an adhesive may be positioned between the cured monomer or prepolymer and the structural support element.

Accordingly, disclosed are optical lens assemblies and associated HMDs that include a deformable element that is coupled to a structural support element by way of a compliant interface material. In some examples, the compliant interface material may form an edge seal for containing a deformable medium between the structural support element and the deformable element. In other examples, the compliant interface material may be positioned across substantially an entire surface area of the deformable element and structural support element. The compliant interface material may have at least one physical property that is intermediate between that of the deformable element and the structural support element. As detailed above, the compliant interface material may enable a wider range of materials to be used as the deformable element, including deformable elements with improved performance and/or manufacturability, compared to configurations in which the deformable element is directly coupled to the structural support element.

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications, combinations, and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An optical lens assembly, comprising:
a substantially transparent deformable element that, when deformed, alters an optical property of the optical lens assembly, the deformable element exhibiting a first coefficient of thermal expansion;
a structural support element exhibiting a second coefficient of thermal expansion that is different from the first coefficient of thermal expansion;
a substantially transparent deformable medium positioned between the structural support element and the deformable element; and
a compliant interface material that is disposed between and couples at least a portion of the deformable element and the structural support element and laterally surrounds the deformable medium, wherein the compliant interface material is configured to compensate for a difference between a physical property of the deformable element and the structural support element, the compliant interface material exhibiting a third coefficient of thermal expansion that falls between the first coefficient of thermal expansion and the second coefficient of thermal expansion.

2. The optical lens assembly of claim 1, wherein the physical property further comprises at least one of:
a stiffness;
an applied pre-tension;
a modulus of elasticity; or
an electrical conductivity.

3. The optical lens assembly of claim 1, further comprising a housing supporting the structural support element and at least partially covering a peripheral edge of the structural support element.

4. The optical lens assembly of claim 3, wherein the compliant interface material is at least partially covered by the housing.

5. The optical lens assembly of claim 1, wherein the deformable element comprises at least one substantially transparent electroactive material that is configured to deform when an electrical voltage is applied thereto.

6. The optical lens assembly of claim 1, further comprising a force distribution ring abutting against the deformable element on a side thereof opposite the compliant interface material, wherein the force distribution ring is configured to deform the deformable element.

7. The optical lens assembly of claim 1, wherein the compliant interface material is disposed along a peripheral edge region of the deformable element or of the structural support element.

8. The optical lens assembly of claim 1, wherein the compliant interface material is disposed along substantially an entire surface area of the deformable element or of the structural support element.

9. The optical lens assembly of claim 1, wherein the compliant interface material comprises a hyperelastic material or a composite material.

10. The optical lens assembly of claim 1, wherein the compliant interface material exhibits anisotropic material properties.

11. The optical lens assembly of claim 1, wherein the compliant interface material is configured to constrain the substantially transparent deformable medium between the deformable element and the structural support element.

12. The optical lens assembly of claim 1, wherein the compliant interface material prevents the deformable element from directly interfacing with any portion of the structural support element.

13. The optical lens assembly of claim 1, wherein at least a portion of the optical lens assembly is asymmetric.

14. The optical lens assembly of claim 1, wherein the structural support element comprises at least one of an eye-tracking element or an optical lens.

15. The optical lens assembly of claim 1, wherein the optical property comprises at least one of an accommodative optical property or an adaptive optical property.

16. The optical lens assembly of claim 1, wherein the compliant interface material comprises at least one of a fiber reinforcement or a nanomaterial reinforcement such that the compliant interface material exhibits an anisotropic stiffness that is stiffer in a lateral direction compared to a vertical direction.

17. A head-mounted display, comprising:
   a display element; and
   an optical lens assembly positioned proximate to the display element, the optical lens assembly comprising:
      a substantially transparent deformable element that, when deformed, alters an optical property of the optical lens assembly, the deformable element exhibiting a first coefficient of thermal expansion;
      a structural support element exhibiting a second coefficient of thermal expansion;
      a substantially transparent deformable medium positioned between the structural support element and the deformable element; and
      a compliant interface material that is disposed between and couples at least a portion of the deformable element and the structural support element and laterally surrounds the deformable medium, wherein the compliant interface material is configured to compensate for a difference between a physical property of the deformable element and the structural support element, the compliant interface material exhibiting a third coefficient of thermal expansion that falls between the first coefficient of thermal expansion and the second coefficient of thermal expansion.

18. A method for fabricating an optical lens assembly, comprising:
   selecting a compliant interface material to compensate for a difference between a physical property of a deformable element and a structural support element, wherein the compliant interface material includes at least one of a fiber reinforcement or a nanomaterial reinforcement such that the compliant interface material exhibits an anisotropic stiffness that is stiffer in a lateral direction compared to a vertical direction; and
   coupling at least a portion of the deformable element to at least a portion of the structural support element via the compliant interface material.

* * * * *